(12) United States Patent
Hammerschmidt et al.

(10) Patent No.: US 11,435,245 B2
(45) Date of Patent: Sep. 6, 2022

(54) TORQUE MEASUREMENT USING MILLIMETER-WAVE METAMATERIAL

(71) Applicant: Infineon Technologies AG, Neubiberg (DE)

(72) Inventors: Dirk Hammerschmidt, Finkenstein (AT); Christof Michenthaler, Feistritz/Gail (AT)

(73) Assignee: Infineon Technologies AG

( * ) Notice: Subject to any disclaimer, the term of this patent is extended or adjusted under 35 U.S.C. 154(b) by 174 days.

(21) Appl. No.: 16/911,618

(22) Filed: Jun. 25, 2020

(65) Prior Publication Data

US 2021/0102854 A1   Apr. 8, 2021

Related U.S. Application Data

(63) Continuation-in-part of application No. 16/591,806, filed on Oct. 3, 2019.

(51) Int. Cl.
*G01L 3/14* (2006.01)

(52) U.S. Cl.
CPC .................. *G01L 3/1492* (2013.01)

(58) Field of Classification Search
CPC ........ G01L 3/1492; G01L 3/105; G01L 3/101
See application file for complete search history.

(56) References Cited

U.S. PATENT DOCUMENTS

| | | | | |
|---|---|---|---|---|
| 7,538,946 B2* | 5/2009 | Smith | ................ | H01Q 15/0086 359/569 |
| 8,015,886 B2* | 9/2011 | Lohr | ..................... | G01L 3/1428 73/862.326 |
| 8,024,956 B2* | 9/2011 | Hammerschmidt | ... | G01D 5/145 73/1.41 |
| 8,421,446 B2* | 4/2013 | Straubinger | ........... | G01D 5/202 324/207.15 |
| 9,026,378 B2* | 5/2015 | Fericean | .................. | G01D 5/20 702/41 |
| 10,035,535 B2* | 7/2018 | Ohira | ...................... | B62D 15/02 |
| 10,422,913 B2* | 9/2019 | Fouda | .................. | G01R 33/022 |
| 10,749,612 B1* | 8/2020 | Iannotti | .................. | H04B 15/02 |
| 10,866,152 B2* | 12/2020 | Hammerschmidt | ...... | G01L 3/00 |
| 2006/0144166 A1* | 7/2006 | Ruehl | ..................... | G01L 3/105 73/862.331 |

(Continued)

Primary Examiner — Freddie Kirkland, III
(74) Attorney, Agent, or Firm — Design IP

(57) ABSTRACT

A torque measurement system includes a first rotatable carrier structure mechanically coupled to a rotational shaft; a second rotatable carrier structure mechanically coupled to the rotational shaft; a first mutually coupled structure including a first track mechanically coupled to the first rotatable carrier structure and a second track mechanically coupled to the second rotatable carrier structure, where the first track and the second track are coupled together by a first torque dependent coupling; a second mutually coupled structure including a third track mechanically coupled to the first rotatable carrier structure and a fourth track mechanically coupled to the second rotatable carrier structure, where the third track and the fourth track are coupled together by a second torque dependent coupling. In response to a rotation of the rotational shaft, the first torque dependent coupling is configured to increase and the second torque dependent coupling is configured to decrease.

30 Claims, 19 Drawing Sheets

(56) References Cited

U.S. PATENT DOCUMENTS

| | | | | |
|---|---|---|---|---|
| 2007/0024387 A1* | 2/2007 | Sandacci | ................. | H01P 1/068 |
| | | | | 333/261 |
| 2008/0116883 A1* | 5/2008 | Ruehl | .................. | G01D 5/2093 |
| | | | | 324/207.17 |
| 2009/0217774 A1* | 9/2009 | Sills | ........................ | G01L 5/221 |
| | | | | 73/862.193 |
| 2009/0314104 A1* | 12/2009 | Lohr | .................... | G01L 3/1428 |
| | | | | 73/862.338 |
| 2017/0090061 A1* | 3/2017 | Fouda | ................. | E21B 47/0228 |
| 2018/0154926 A1* | 6/2018 | Ohira | .................... | B62D 15/02 |
| 2019/0376858 A1* | 12/2019 | Hammerschmidt | ...... | G01L 3/00 |
| 2021/0033703 A1* | 2/2021 | Hammerschmidt | .... | G01S 7/411 |

\* cited by examiner

TORQUE MEASUREMENT USING MILLIMETER-WAVE METAMATERIAL

CROSS-REFERENCE TO RELATED APPLICATIONS

This application is a continuation-in-part of U.S. patent application Ser. No. 16/591,806 filed Oct. 3, 2019, which is incorporated by reference as if fully set forth.

FIELD

The present disclosure relates generally to a torque measurement system and to methods for measuring torque of a rotatable object.

BACKGROUND

Vehicles feature numerous safety, body, and powertrain applications that rely on speed sensing, position sensing, and/or angle sensing, as well as torque measurements. For example, in a vehicle's Electronic Stability Program (EPS), magnetic angle sensors and linear Hall sensors can be used to measure steering angle and steering torque. Modern powertrain systems can rely on magnetic speed sensors for camshaft, crankshaft and transmission applications, along with automotive pressure sensors, to achieve required $CO_2$ targets and smart powertrain solutions. However, a disadvantage of known solutions is that they are sensitive to magnetic disturbances.

Magnetic disturbance fields are prevalent in vehicles such that magnetic angle-measurements often have to endure harsh environments. This is especially problematic in hybrid and electric vehicles, where many wires with high currents are located near the sensor system. Thus, external magnetic disturbance fields may be generated by current-rails in a vehicle that influence the accuracy of the magnetic angle measurements. Thus, a torque measurement sensor that is robust against electromagnetic stray fields may be desirable.

SUMMARY

Embodiments provide a torque measurement system that includes: a first rotatable carrier structure mechanically coupled to a rotational shaft and configured to rotate about a rotational axis in a rotation direction; a second rotatable carrier structure mechanically coupled to the rotational shaft and configured to rotate about the rotational axis in the rotation direction, wherein the second rotatable carrier structure is spaced apart from the first rotatable carrier structure; a first metamaterial track mechanically coupled to the first rotatable carrier structure, wherein the first metamaterial track includes a first array of elementary structures; a second metamaterial track mechanically coupled to the first rotatable carrier structure, wherein the second metamaterial track includes a second array of elementary structures; a third metamaterial track mechanically coupled to the second rotatable carrier structure, wherein the third metamaterial track includes a third array of elementary structures that are geometrically shifted in a first circumferential direction relative to the first array of elementary structures when zero torque is applied to the rotational shaft, and a fourth metamaterial track mechanically coupled to the second rotatable carrier structure, wherein the fourth metamaterial track includes a fourth array of elementary structures that are geometrically shifted in a second circumferential direction relative to the second array of elementary structures when zero torque is applied to the rotational shaft, the second circumferential direction being counter directional to the first circumferential direction. The first metamaterial track and the third metamaterial track are mutually coupled to each other by a first torque dependent coupling, thereby forming a first mutually coupled structure. The second metamaterial track and the fourth metamaterial track are mutually coupled to each other by a second torque dependent coupling, thereby forming a second mutually coupled structure.

Embodiments provide a method of determining a torque applied to a rotatable shaft. The method includes: transmitting electro-magnetic transmit signals towards a first mutually coupled structure and a second mutually coupled structure that are mechanically coupled to the rotatable shaft; converting, by the first mutually coupled multitrack structure, a first one of the electro-magnetic transmit signals into a first electro-magnetic receive signal; converting, by the second mutually coupled multitrack structure, a second one of the electro-magnetic transmit signals into a second electro-magnetic receive signal; receiving the first electro-magnetic receive signal and the second electro-magnetic receive signal in a time-multiplexed manner; evaluating the received first electro-magnetic receive signal and the received second electro-magnetic receive signal; and determining the torque applied to the rotatable shaft based on the evaluated first electro-magnetic receive signal and the evaluated second electro-magnetic receive signal.

Embodiments provide a torque measurement system that includes: a first rotatable carrier structure mechanically coupled to a rotational shaft and configured to rotate about a rotational axis in a rotation direction; a second rotatable carrier structure mechanically coupled to the rotational shaft and configured to rotate about the rotational axis in the rotation direction, wherein the second rotatable carrier structure is spaced apart from the first rotatable carrier structure; a first mutually coupled structure including a first track mechanically coupled to the first rotatable carrier structure and a second track mechanically coupled to the second rotatable carrier structure, wherein the first track and the second track are coupled together by a first torque dependent coupling; a second mutually coupled structure including a third track mechanically coupled to the first rotatable carrier structure and a fourth track mechanically coupled to the second rotatable carrier structure, wherein the third track and the fourth track are coupled together by a second torque dependent coupling. In response to a rotation of the rotational shaft, the first torque dependent coupling is configured to increase and the second torque dependent coupling is configured to decrease.

BRIEF DESCRIPTION OF THE DRAWINGS

Embodiments are described herein making reference to the appended drawings.

DETAILED DESCRIPTION

Figure 1:
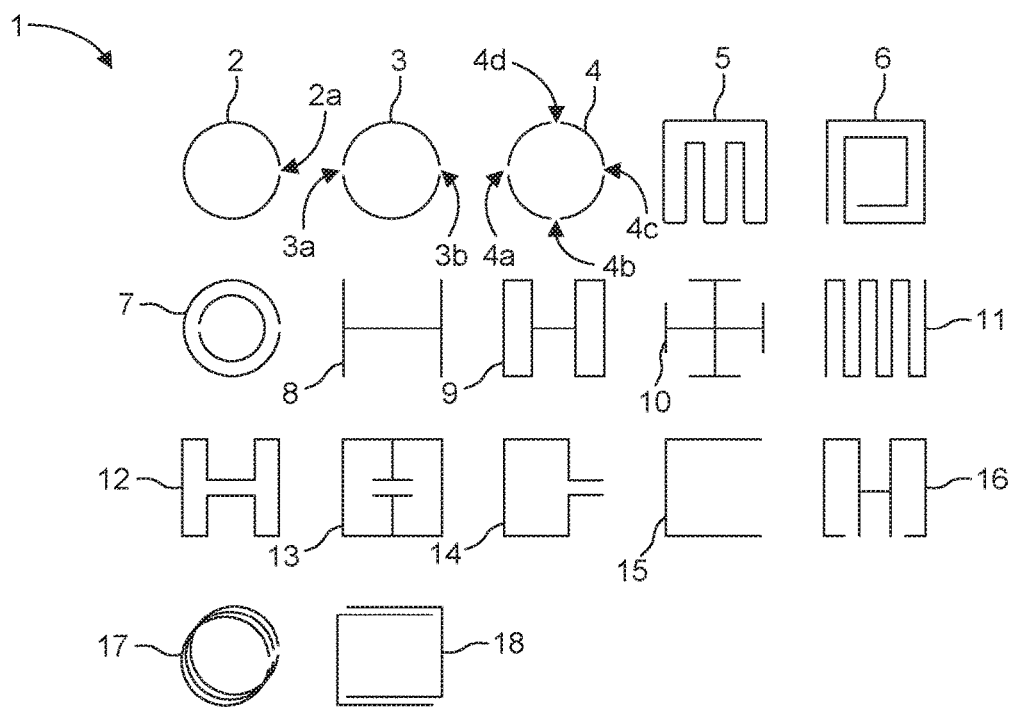
FIG. 1 illustrates a plurality of possible elementary structures according to one or more embodiments.

In the following, various embodiments will be described in detail referring to the attached drawings. These embodiments are given for illustrative purposes only and are not to be construed as limiting. For example, while embodiments may be described as comprising a plurality of features or elements, in other embodiments, some of these features or elements may be omitted, and/or may be replaced by alternative features or elements. In other embodiments, further features or elements in addition to those explicitly shown or described may be provided. In addition, features of the different embodiments described hereinafter may be combined with each other to form further embodiments, unless specifically noted otherwise. For example, variations or modifications described with respect to one of the embodiments may also be applicable to other embodiments unless noted to the contrary.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. Functional blocks may be implemented in hardware, firmware, software, or a combination thereof.

Embodiments relate to sensors and sensor systems, and to obtaining information about sensors and sensor systems. A sensor may refer to a component which converts a physical quantity to be measured to an electric signal, for example, a current signal or a voltage signal. In general, a physical quantity may for example comprise a magnetic field, an electric field, radio waves, a pressure, a force, a current or a voltage, but is not limited thereto. A sensor device, as described herein, may be an angle sensor, a linear position sensor, a speed sensor, a motion sensor, and the like.

The sensor circuit may be referred to as a signal processing circuit and/or a signal conditioning circuit that receives one or more signals (i.e., sensor signals) from one or more sensor elements in the form of raw measurement data and derives, from the sensor signal, a measurement signal that represents the physical quantity.

It will be appreciated that the terms "sensor", "sensor element", and "sensing element" may be used interchangeably throughout this description, and the terms "sensor signal" and "measurement signal" may also be used interchangeably throughout this description.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Thus, the sensor circuit may include an analog-to-digital converter (ADC) that converts the analog signal from the one or more sensor elements to a digital signal. The sensor circuit may also include a digital signal processor (DSP) that performs some processing on the digital signal. Therefore, the sensor package may include a circuit that conditions and amplifies the small signal of the sensor element via signal processing and/or conditioning.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Embodiments are discussed below in the context of a millimeter wave (mm-wave) sensor and mm-wave systems that include a mm-wave transmitter, a mm-wave receiver, and/or a mm-wave transceiver. Mm-waves are radio waves designated in the band of radio frequencies in the electromagnetic spectrum from 30 to 300 gigahertz (GHz) and may also be used as radar waves. Thus, a mm-wave sensor, system, transmitter, receiver, or transceiver described herein may also be regarded to as a radar sensor, system, transmitter, receiver, or transceiver, and a mm-wave may be regarded to as a radar signal. It should be noted, however, that the embodiments may also be applied in applications different from radar such as, for example, radio frequency (RF) transmitters, receivers, or transceivers of RF communication devices. In fact, any RF circuitry may take advantage of the concepts described herein. A mm-wave sensor or mm-wave system may be configured as an angle sensor, a linear position sensor, a speed sensor, a motion sensor, and the like.

A metamaterial is a material engineered to have a property that is not found in naturally occurring materials. They are made from assemblies of multiple structural elements fashioned from composite materials such as metals or plastics. The materials may be arranged in repeating or periodic patterns, at scales that are smaller than the wavelengths of the phenomena they influence. In other words, metamaterials attain the desired effects by incorporating structural elements of sub-wavelength sizes, i.e., features which are actually smaller than the wavelength of the electromagnetic waves that they affect.

As a result, metamaterials derive their properties not necessarily from the properties of the base materials, but from their designed structures. Their precise shape, geometry, size, orientation, and arrangement of the structural elements gives the metamaterials their smart properties capable of manipulating electromagnetic waves: by blocking, reflecting, absorbing, enhancing, or bending waves, to achieve benefits. Thus, a metamaterial is defined as an artificial composite that gains its electrical properties from its exactingly-designed structures and their arrangement rather than inheriting them directly from which the materials it is composed.

A metamaterial may be a subset of a larger group of heterogeneous structures consisting of a base solid material and elements of a different material. The distinction of metamaterials is that they have special, sometimes anomalous, properties over a limited frequency band. For example, mm-wave metamaterials may exhibit special properties over a millimeter band, which is the band of spectrum between 30 GHz and 300 GHz noted above.

In the context of the described embodiments, a metamaterial is a two-dimensional (2D) or three-dimensional (3D) array of elementary structures, which are coupled to each other. "Elementary structures," as used herein, may be referred to as discrete structures, element structures, or a combination thereof. In some cases, the elementary structures may be referred to simply as "structures."

The overall array provides macroscopic properties, which can be designed by the used elementary structures and their coupling paths. Metamaterials are configured for different kind of waves like electromagnetic waves (e.g., optical, infrared (IR), and mm-waves) and mechanical waves (e.g., ultrasonic). The scale of the elementary structures and their grid pitch scale with the wavelength of the target frequency range.

Elementary structures in mm-wave metamaterials may include resonator-elements, antenna-elements, filter-elements, waveguide-elements, transmission line elements, or a combination of those shown in FIG. 1. The elementary structure size may range up to several wavelengths but is typically below one wavelength. They consist of parts that generate magnetic fields (e.g., conductor rings) and other parts that create electrical fields (e.g., gaps between conductors). Furthermore, they also may have elements that have electromagnetic wave properties, such as a short transmission line segment.

In general, those elementary structures electrically represent resistive-inductive-capacitive (RLC) networks. In the frequency range where they will be used in the meta material, the characteristic of their resistive, inductive, and capacitive parameters is distributed over the geometry. Since filters, resonators, transmission lines, and antennas can be differently parametrized representatives of identical structures it is often not unambiguously possible to assign a structure to a single group. Thus, it is to be understood that a structure described as resonator can also be seen as antenna or a filter depending on its use or implementation details. Furthermore, the behavior may also change with the frequency where it is operated and a structure that behaves as transmission line for one frequency may also expose a filter characteristic or create a resonance at another frequency of operation. Finally, the choice of the material impacts the behavior which means that a choice of a better conductor will emphasize a resonant behavior while a less conductive material will increase the damping and make a filter characteristic dominant.

FIG. 1 illustrates a plurality of possible elementary structures according to one or more embodiments. The elementary structures 1 include a split ring resonator 2 having one capacitor coupling 2a, a split ring resonator 3 having two capacitor couplings 3a and 3b, a split ring resonator 4 having four capacitor couplings 4a-4d, antenna structure 5, an antenna coil 6, a nested split ring resonator 7, antenna structure 8, antenna structure 9, antenna structure 10, transmission line structure 11, antenna structure 12, coupled split ring resonators 13, split ring resonator 14, partial ring or coupling structure 15, and coupled split ring resonator 16.

The transmission line structure 11 may be a damping structure or delay structure. It may be used in an alternating configuration with resonators in order to establish an attenuated or phase shifted coupling between them instead of coupling directly. Coupling to the resonators can be capacitive or galvanic. It may also extend onto a second layer, for example, with an identical structure creating a real transmission line (i.e., two parallel wires).

The partial ring or coupling structure 15 may be referred to as a partial ring structure in the context of it being half of a split ring resonator 18. In this context, the partial ring structure 15 is coupled to a second layer to form a resonator. The partial ring or coupling structure 15 may also be used as a coupling structure as in the example in FIG. 3B. In this context, it provides capacitive coupling between ring resonator elements, but will not resonate remarkably (at least at the low frequency) as the coupled split ring resonators.

Furthermore, the elementary structures can be three-dimensional as well, such as spiral coils and nested split ring resonators that are oriented into all three Cartesian coordinate directions. Furthermore, three-dimensional structures can be generated by layering two-dimensional elementary structures in a stacked arrangement. For example, two elementary structures may be layered over one another in a vertical dimension so that they overlap with each other. In this way, a vertical capacitive coupling may be achieved between the two elementary structures and may be adjusted by varying an amount of overlap in a horizontal dimension.

FIG. 1 further illustrates a stacked split ring resonator structure 17 having three split ring resonators stacked on top of each other. The stacked split ring resonator structure 17 may be formed by using three metallization layers stacked on top of each other. FIG. 1 further illustrates a split ring resonator 18 made of two half-ring structures 15 that overlap such that a vertical capacitive coupling exists between the two half-ring structures. By varying the amount of overlap, the loop size can be made larger (e.g., by decreasing the amount of overlap) or smaller (e.g., by increasing the amount of overlap), which in turn results in a lower vertical capacitive coupling or a higher vertical capacitive coupling, respectively.

In order to achieve a quasi-homogeneous macroscopic behavior, the elementary structures are arranged in arrays which typically have dimensions that are larger than a wavelength of the target frequency range and include a multitude of elementary structures in each utilized direction.

Figures 2A, 2B:
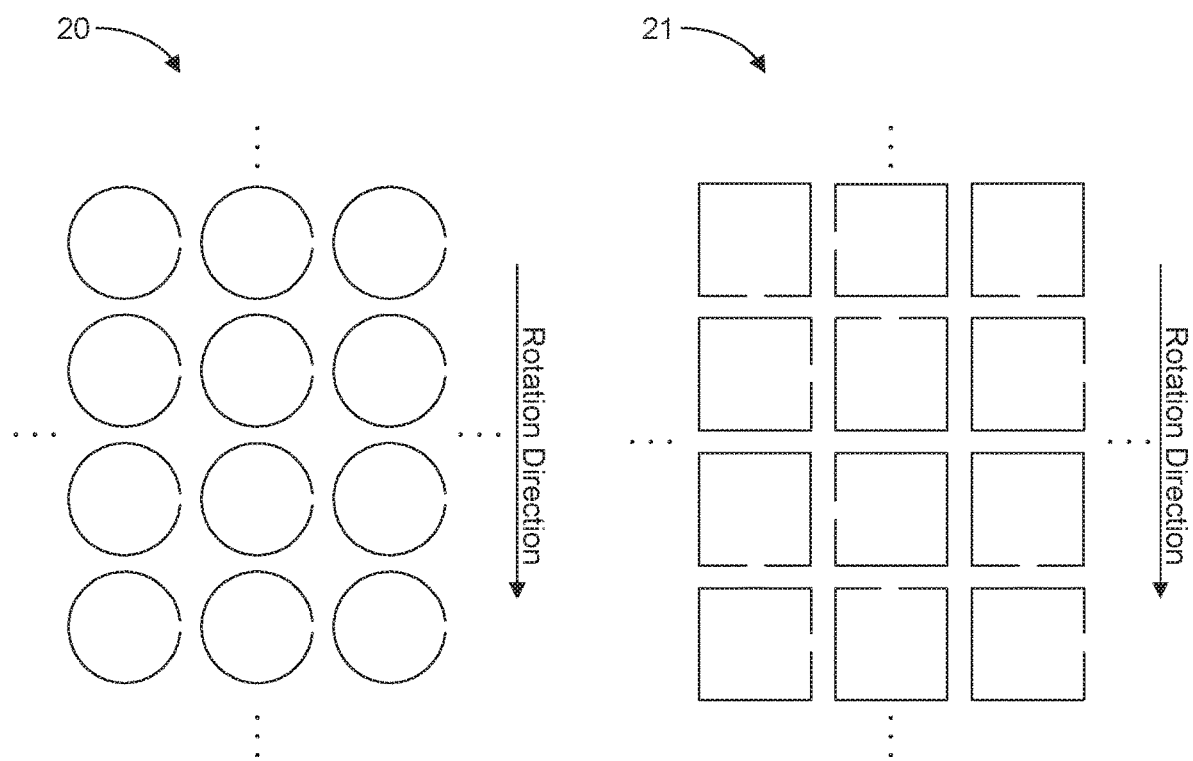
FIGS. 2A and 2B illustrate a segment of a mm-wave metamaterial track according to one or more embodiments.

FIGS. 2A and 2B illustrate a segment of a mm-wave metamaterial track according to one or more embodiments. A mm-wave metamaterial track is a stripe of mm-wave metamaterial that has multiple elementary structures arranged in both widthwise (transverse) and lengthwise (rotational) dimensions. Here, the directions orthogonal to a rotation direction may be referred to as a radial direction or an axial direction.

A circumferential direction or a rotational direction follows a circumference of a track, or portion thereof, that forms a full or a partial loop around a rotational axis. Thus, a circumferential direction or a rotational direction can be either a clockwise direction or a counter-clockwise direction. The radial direction extends along a surface of rotatable target object orthogonal to the rotational axis. In other words, the radial direction may be used to define a radius or a radial dimension from the rotational axis. The axial direction extends parallel to the rotational axis (e.g., from one rotatable target object to another rotatable target object). A transvers direction may refer to a width dimension of a mm-wave metamaterial track, which may extend in either the radial direction or the axial direction depending on the arrangement of the track about the rotational axis.

Specifically, FIG. 2A shows an example of a 2D array 20 of split ring resonators, which are expected to extend further in both horizontal and rotational (circumferential) directions. However, it will be appreciated that the split ring resonators may be exchanged with any type of elementary structure, for example, with any of those shown in FIG. 1. Each split ring resonator comprises an open ring that represents an inductivity (L) and a gap or opening that provides a capacitive coupling (C). Thus, each split ring resonator is a type of LC resonator.

The elementary structures that make up the segment of a mm-wave metamaterial track shown in FIG. 2A have a fixed arrangement or fixed property along the rotation direction. For example, the split ring resonators in each row are arranged in the same position and orientation. Furthermore, the spacing between adjacent split ring resonators in the rotation direction is fixed along the track. As such, array 20 does not have any change in property of the metamaterial structures along the track in the rotation direction. One or more properties between the structures, such as spacing and orientation, may change in the radial direction as long as each row of structures has the same pattern.

There exists a mutual coupling of the structures in the array 20, which can be a capacitive coupling, an inductive coupling, or both. In this case, both types of coupling is present. For example, capacitive coupling between structures exists in the vertical direction (i.e., along the rotation direction) on the sides where rings are close together. In addition, inductive coupling between structures is provided by the field generated by each split ring resonator.

Thus, electrically, the arrangement of the elementary structures in an array introduces a mutual coupling between the elementary structures, wherein the coupling effect may utilize electric field (capacitive near field coupling), magnetic field (inductive near field coupling), waveguide coupling, or electromagnetic waves (far field coupling). Due to the dimensions of the arrays and depending on the type of used elementary structures, the coupling effect will typically made up of a mixture of all mechanisms.

The manner in which the structures are coupled affects the coupling behavior of the array or a portion of that array. In turn, this coupling behavior impacts an effect the individual structures or a group of structures have on a transmission wave or signal incident on that structure or that group of structures.

Furthermore, the coupling effect between structures is different if gaps or openings of neighboring structures are face-to-face or if the gaps face (i.e., are adjacent to) a closed segment of a neighboring structure. For example, FIG. 2B shows an example of 2D array 21 of split ring resonators in which an orientation of the split ring resonators changes in both the horizontal (width) and vertical (length) directions of the array 21 (i.e., of the metamaterial track). In other words, the location of the gap of each split ring resonator varies across neighboring structures and the rows of structures have different patterns. Here, while not required, it is possible that each row of structures has a unique pattern. As a result, the coupling effect between structures in FIG. 2B is different than the coupling effect produced by the structures shown in FIG. 2A.

Furthermore, the coupling effect between structures in FIG. 2B changes partially along the array in the rotation direction, whereas the coupling effect between structures in FIG. 2A does not change along the array in the rotation direction. The different shapes (circular versus rectangular) may also impact the characteristic of the structure itself and the coupling effect.

Each elementary structure has a size (e.g., a width or diameter) of 10% to 100% of the wavelength of a transmitted mm-wave to which the structure is sensitive. The array 20 may be a single metallization layer disposed or printed on a film such that the array 20 is two-dimensional. As noted above, it may also be possible to stack multiple metallization layers to form a 3D array.

Thus, arrays of elementary structures described herein include multiple repetitions of element structures having same or differing arrangements with respect to each other that induce a property on a transmission wave or signal incident thereon due to the coupling effect between the structures. As will be seen in FIGS. 3A-3G, at least one property changes along the array in the rotation direction which causes at least one coupling effect between elementary structures of the array to change continuously along the array in the rotation direction. This may allow, for example, to determine a rotational position change and/or a rotational angular position of the array. In contrast, for array 20, the properties are fixed along the array in the rotation direction such that the coupling effects between elementary structures of the array do not change and remain fixed along the array in the rotation direction.

As will become apparent in the following description, one or more mm-wave metamaterial tracks may also be used to perform torque measurements and/or off-axis angle measurements pertaining to a rotatable target object.

A mm-wave metamaterial track may be provided on a target object such that it forms a closed loop around an axis of rotation, thereby forming a 360° periodical pattern. In this way, a target object is a carrier structure for a mm-wave metamaterial track to be disposed. For example, the elementary structures of an array may have a 360° periodical pattern that may or may not change continuously around the circumference of the rotatable target and/or along the perimeter of the metamaterial track. For example, tracks used for direct torque measurement may not have any change in property of the metamaterial structures along the track in the rotational direction, such as the case for array 20. In contrast, tracks used for angle measurement, rotational position change, or indirect torque measurement may change in property of the metamaterial structures along the track in the rotational direction, such as the case for those tracks shown in FIGS. 3A-3G. If the pattern changes along the rotation direction, it may do so by continuously changing from 0° to 360° along the closed-loop of the metamaterial track, and then repeat.

There are diverse possibilities for changing a metamaterial property according to a 360° periodical pattern. It will also be appreciated that a rotational segment of less than 360° may also be applicable. For example, applications that measure limited angle ranges (e.g. throttle valve, chassis level, gas pedal) may also be used. In these cases, the target pattern need not be 360° periodic and can simply change the pattern from a minimum value to a maximum value over the used angle range (e.g., 45°, 60°, 90°, 180° etc.). It naturally follows that the target object also does not need to be a complete disc and can be reduced to a segment.

A property and/or arrangement of the metamaterial may be specific to an absolute angular position along the metamaterial track, and, thus, is also specific to an absolute angular position of the rotatable target object. An absolute angular position is an angular position relative to a predetermined (i.e., reference) angular position of the rotatable target object. For example, the reference angular position may be zero degrees, and an absolute angular position may a specific position rotated from zero degrees over a 360° period. Thus, each absolute angular position has an absolute angular value from 0° to 360°.

The following different variations may be used to change the behavior of metamaterial along a rotation direction. Thus, FIGS. 3A-3G show different arrangements or patterns of elementary structures of a metamaterial according to one or more embodiments. These tracks may be used for angle measurement of a corresponding carrier substrate, a rotational position change of a corresponding carrier substrate, or an indirect torque measurement of a torque applied to a rotatable shaft.

Figure 3A:
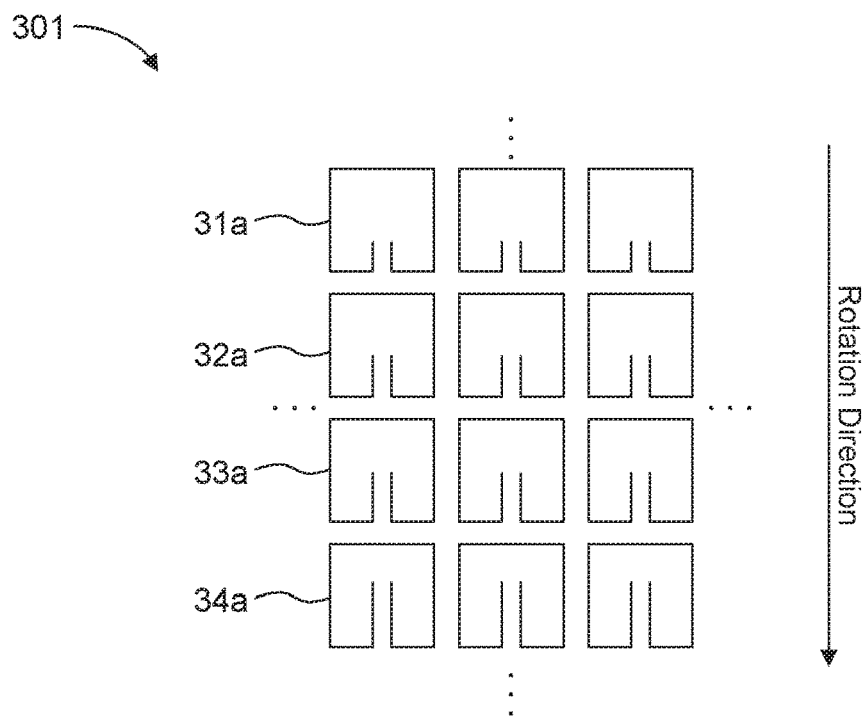
FIGS. 3A-3G show different arrangements or patterns of elementary structures of a metamaterial according to one or more embodiments.

FIG. 3A is a schematic diagram of an array of elementary structures 301 of a metamaterial track according to one or more embodiments. Here, the array includes multiple rows of split ring resonators 31a-34a in which the structures in each row have a same configuration and orientation. However, the structures in different rows have different configurations.

A 360° periodical pattern may be used to change the coupling capacitance of the split ring resonators along the rotation direction. For example, the coupling capacitance may be increased (or decreased) in the direction of rotation. Here, this is achieved by increasing (or decreasing) the length of the lines inside the opening of the split ring resonator, which results in a gradual and continuous increase (or decrease) in coupling capacitance in the rotation direction. This change in coupling capacitance along the rotation direction (i.e., along the perimeter of the metamaterial track) shifts the resonance frequency such that the change in the phase shift or the amplitude of a receive signal with respect to the transmit signal can be measured. Each phase shift value or amplitude value is specific to an absolute angular position (i.e., an angular value) of the rotatable target object.

Figure 3B:
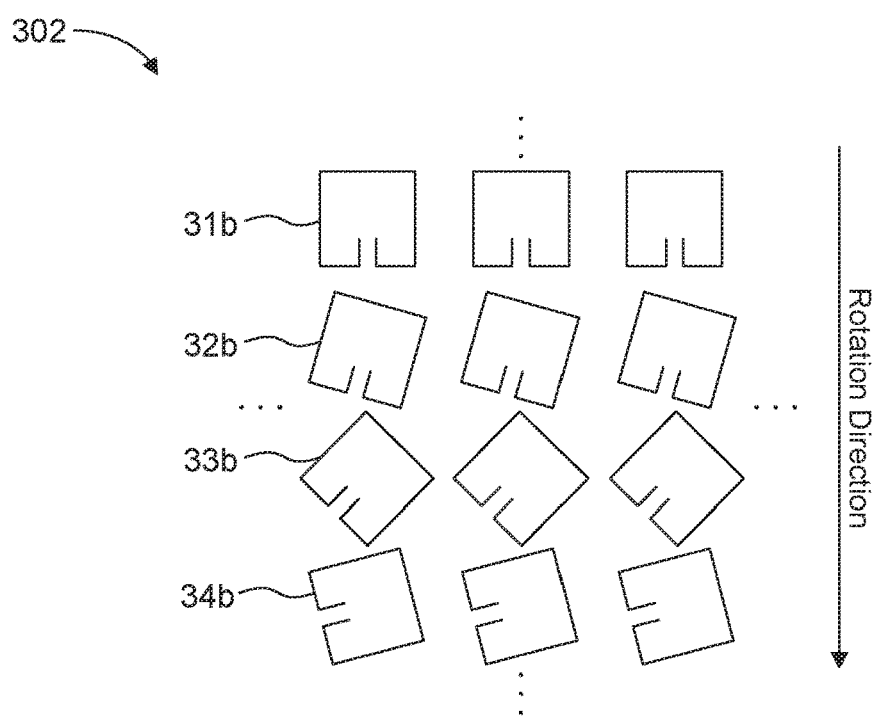

FIG. 3B is a schematic diagram of an array of elementary structures 302 of a metamaterial track according to one or more embodiments. Here, the array includes multiple rows of split ring resonators 31b-34b in which the structures in each row have a same configuration and orientation. However, the structures in different rows have different orientations.

Thus, on the surface of the target object, the split ring resonators 31b-34b are rotated or pivoted (e.g., clockwise or counterclockwise) incrementally in varying degrees along the rotation direction. As a result, the structures in each row have a different angled orientation with respect to structures in neighboring rows, resulting in a gradual and continuous increase (or decrease) in coupling capacitance in the rotation direction. This makes the metamaterial sensitive to a polarization of the mm-wave, and, specifically changes the sensitivity to the electrical field component of the transmitted wave that changes along the rotation direction. Here, an influence on the polarization is realized since the direction of the dominant E Field in the gap is changing. Thus, a shift in polarization may be measured that is specific to the absolute angular position (i.e., an angular value) of the rotatable target object.

Figure 3C:
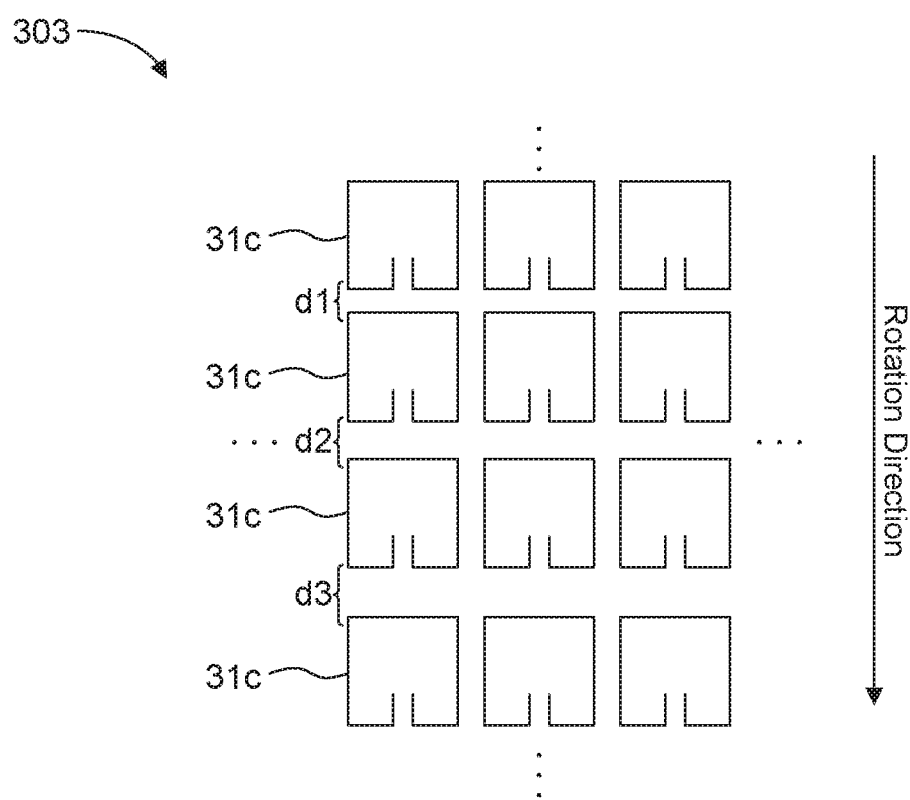

FIG. 3C is a schematic diagram of an array of elementary structures 303 of a metamaterial track according to one or more embodiments. Here, the array includes multiple rows of split ring resonators 31c in which the structures in throughout the array have a same configuration and orientation.

Here, the mutual capacitive coupling of the structures is gradually and continuously changed in the rotation direction by increasing or decreasing the distances d1, d2, d3, and so on between structures along the rotation direction. Thus, rows at the top are closer together than the rows at the bottom of the array. This scales the capacitance between structures in way that is periodical over 360°.

Figure 3D:
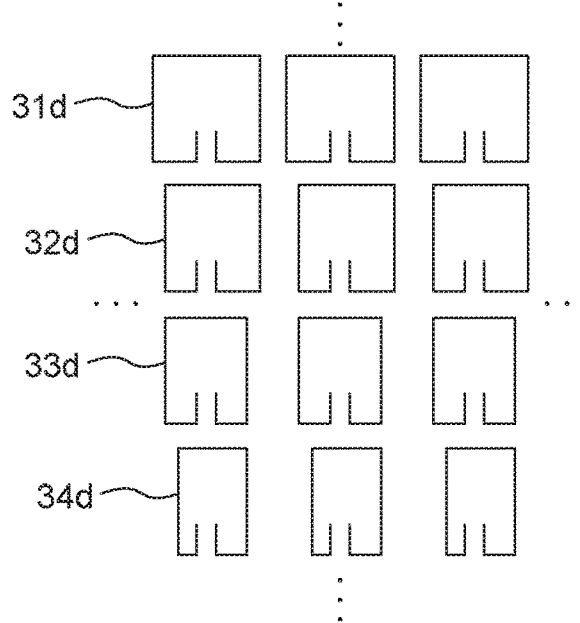

FIG. 3D is a schematic diagram of an array of elementary structures 304 of a metamaterial track according to one or more embodiments. Here, the array includes multiple rows of split ring resonators 31d-34d in which the structures in each row have a same configuration and orientation. However, the structures in different rows have different configurations.

In this case, an inductive coupling scaled by reducing or increasing the loop area along the rotation direction. For example, the loop size of consecutive rows gradually changes along the rotation direction. Thus, the loop size of the split ring resonators 31d is larger than the loop size of the split ring resonators 32d, which is larger than the loop size of the split ring resonators 33d, and so on. This also results in a change in the spacing between structures in the direction perpendicular to the rotation direction, which may further change the capacitive coupling. This scales the inductive coupling and/or the capacitive coupling between structures in way that is periodical over 360°.

Figure 3E:
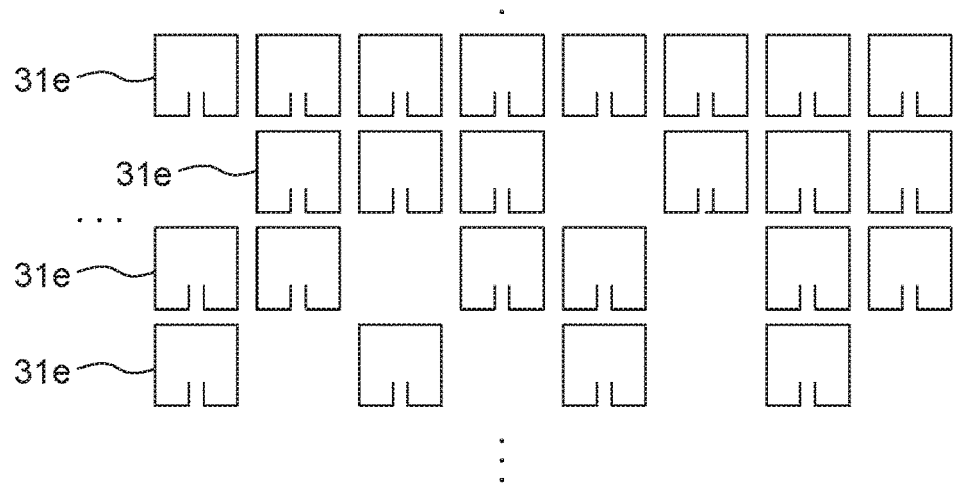

FIG. 3E is a schematic diagram of an array of elementary structures 305 of a metamaterial track according to one or more embodiments. Here, the array includes multiple rows of split ring resonators 31e in which the structures in throughout the array have a same configuration and orientation. However, the density of the structures is changed in the rotation direction by gradually and continuously increasing or decreasing the density of the structures along the rotation direction.

For example, each successive row of structures may be populated more densely or less densely than a preceding row of structures. For example, every position in a first row may be occupied by a structure making up a first (full) density of structures in that row. In a second row, less than every position is occupied by a structure making up a second density of structures in that row that is less dense than the first density. In a third row, less than every position is occupied by a structure making up a third density of structures in that row that is less dense than the second density, and so on. This scales the inductive coupling and/or the capacitive coupling between structures in way that is periodical over 360°.

Figure 3F:
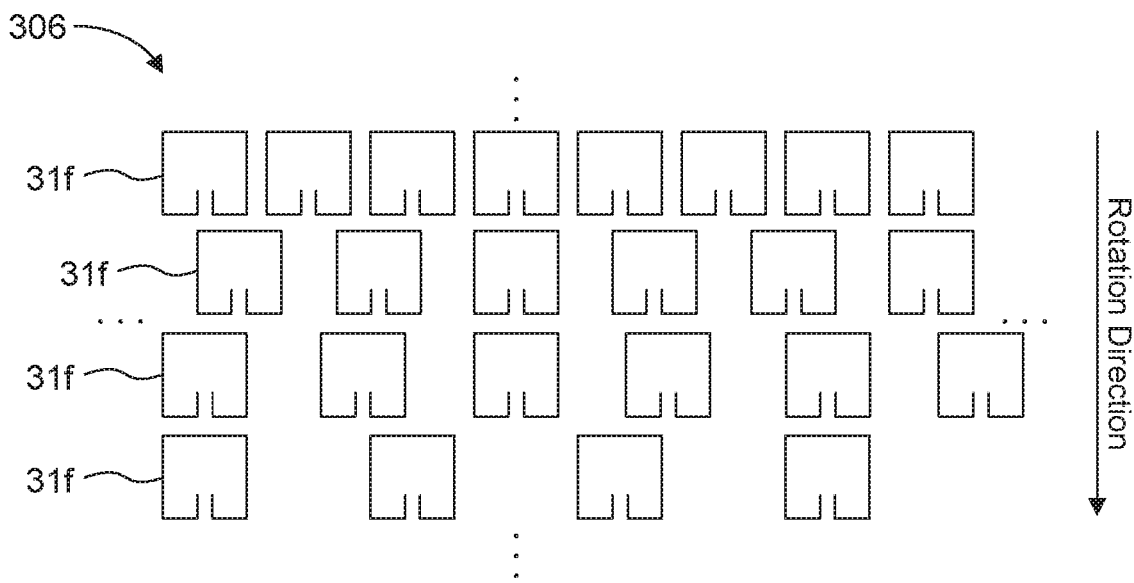

FIG. 3F is a schematic diagram of an array of elementary structures 306 of a metamaterial track according to one or more embodiments. Here, the array includes multiple rows of split ring resonators 31f in which the structures in throughout the array have a same configuration and orientation. However, the density of the structures is changed in the rotation direction by gradually and continuously increasing or decreasing the density of the structures along the rotation direction.

In this example, a lateral distance between structures in each successive row may be changed in the rotation direction by increasing or decreasing the spacing between structures along the rotation direction. For example, every position in a first row may be occupied by a structure making up a first (full) density of structures in that row. In a second row, the spacing between adjacent structures is increased in comparison to the spacing between adjacent structures in the first row, making up a second density of structures in that row that is less dense than the first density. In a third row, the spacing between adjacent structures is increased in comparison to the spacing between adjacent structures in the second row, making up a third density of structures in that row that is less dense than the second density, and so on.

Figure 3G:
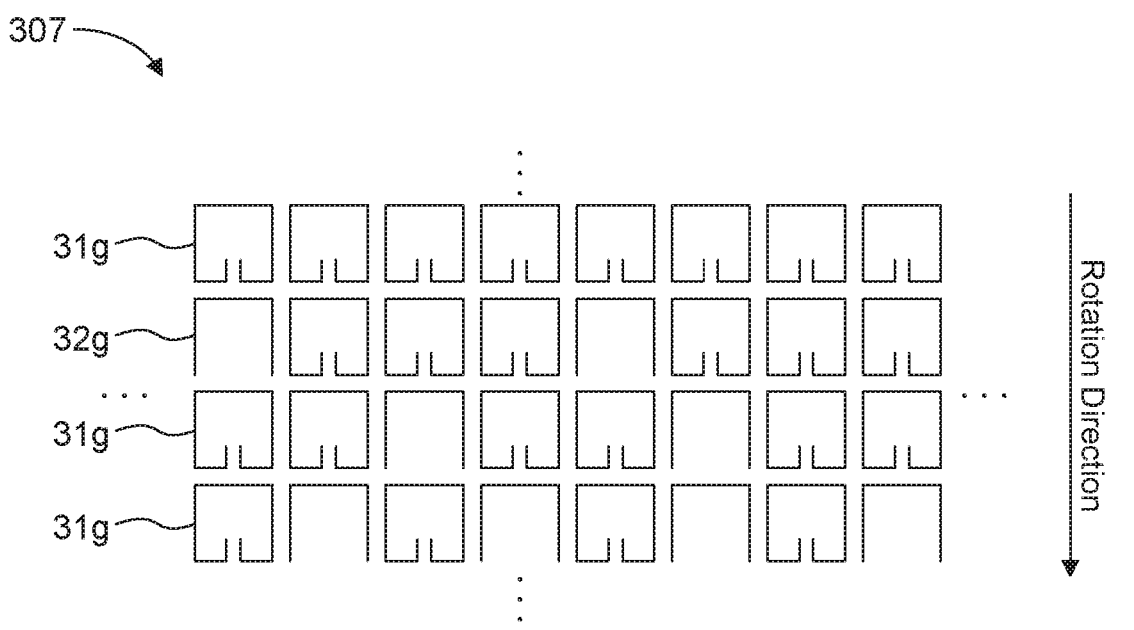

FIG. 3G is a schematic diagram of an array of elementary structures 307 of a metamaterial track according to one or more embodiments. Here, the array is a heterogeneous array of mixed different structures such that the structure types that populate the array is varied in different arrangements throughout the array. In this case, two different types of structures 31g and 32g are use in a pattern that gradually and continuously changes the inductive coupling and/or the capacitive coupling between structures in way that is periodical over 360°. It will be appreciated that two or more types of structures may also be used to form the heterogeneous array.

In view of the above examples, scaling of a metamaterial property is done with a pattern of structures that repeats or changes completely and continuously around the circumference of the rotatable target or along the perimeter of the metamaterial track such that a change in reflectivity and/or transmittivity follows a 360° periodical pattern where the reflectivity and/or transmittivity is unique for each discrete angle.

Figure 4A:
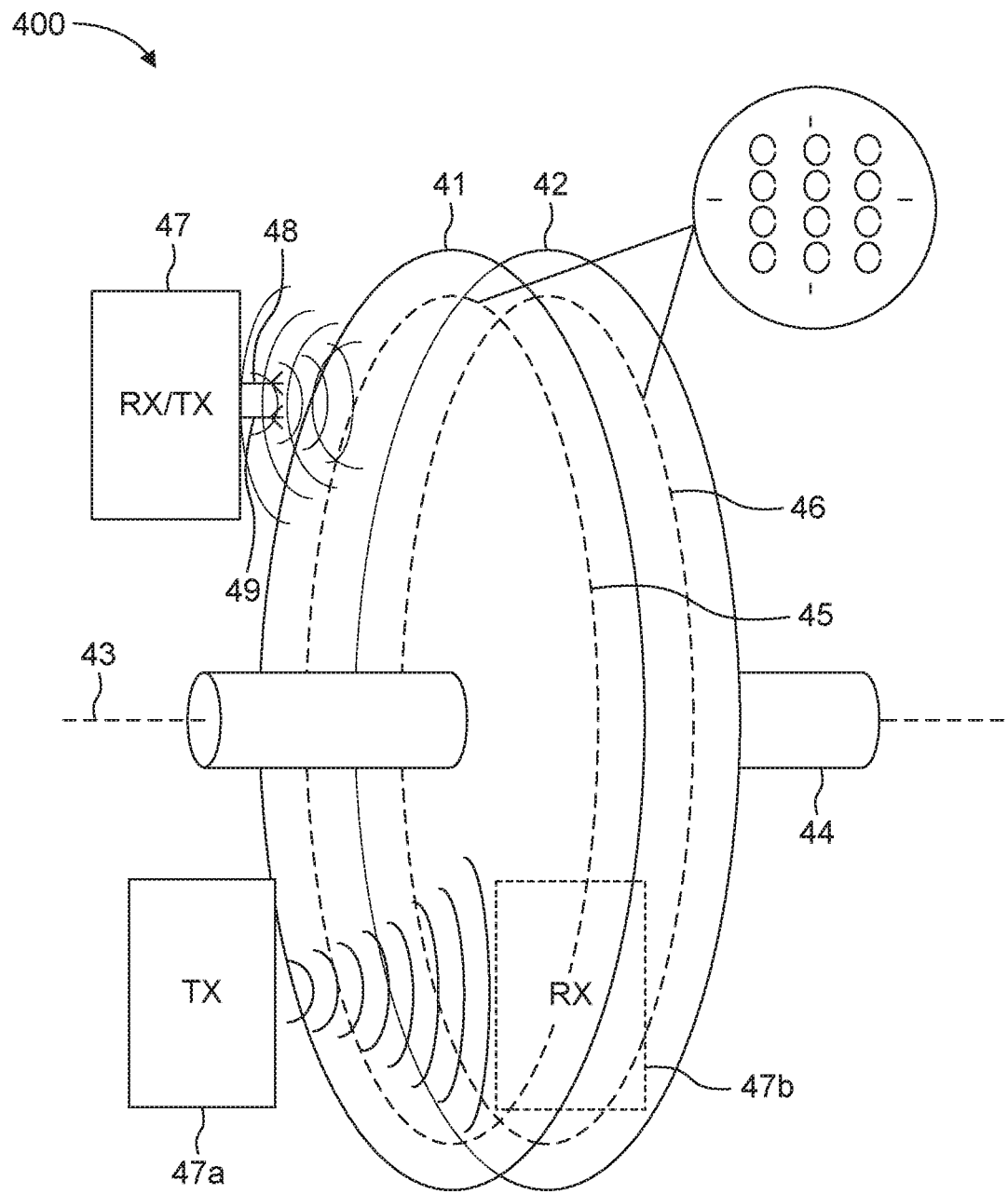
FIG. 4A is a schematic view of a torque measurement system according to one or more embodiments.

FIG. 4A is a schematic view of a torque measurement system 400 according to one or more embodiments. The torque measurement system 400 includes a first rotatable target object 41 as a first rotatable carrier structure and a second rotatable target object 42 as a second rotatable carrier structure. Both carrier structures are configured to rotate about an axis of rotation 43 (i.e., a rotational axis). The rotatable target objects 41 and 42 may be a disc or a wheel coupled to a shaft 44 that extends along the rotational axis 43. As the shaft 44 rotates, so do the rotatable target objects 41 and 42. The rotatable target objects 41 and 42 represent mechanical targets for one or more mm-wave beams. Additionally, the rotatable target objects 41 and 42 are laterally separated from each other by a distance along the shaft 44. In particular, they are laterally spaced apart from each other in a transmission direction of mm-wave beams.

Each rotatable target object 41 and 42 includes a mm-wave metamaterial track 45 and 46, respectively, that each form a closed loop around the shaft 44. In this regard, each target object 41 and 42 is a carrier structure for its respective mm-wave metamaterial track. The mm-wave metamaterial tracks 45 and 46 are fixed to a respective rotatable target object 41 or 42 such that they co-rotate with the respective rotatable target object 41 or 42 as it rotates. Additionally, the mm-wave metamaterial tracks have the same size and shape. As such, in a similar manner regarding the rotatable target objects 41 and 42, the metamaterial tracks 45 and 46 are laterally spaced apart from each other, and, more particularly, are laterally spaced apart from each other in a transmission direction of mm-wave beams.

According to at least one embodiment, metamaterial tracks 45 and 46 each have an array of structures whose properties do not change in the rotation direction, as explained above in reference to FIG. 2A. Furthermore, the two metamaterial tracks 45 and 46 are close enough that the two tracks have a mutual coupling with each other that is induced by a field effect (e.g., an electric field coupling, a magnetic field coupling, or an electromagnetic field coupling) thereby forming a resonant multitrack structure (i.e., a mutually coupled structure). The mutual coupling between tracks 45 and 46 results in a torque-dependent behavior or interaction with an mm-wave where the torque-dependent behavior or interaction is a torque-dependent reflection, a torque-dependent absorption, a torque-dependent transmission, or a torque-dependent combination thereof.

When the shaft 44 rotates, there is a torque dependent shift in angular position (i.e., an angular shift) between the two metamaterial tracks 45 and 46 due to the torque applied to the shaft 44. This results in a torque dependent shift in the mutual coupling between the two metamaterial tracks 45 and

46. Since multiple of the metamaterial properties change simultaneously in response to the applied torque, multiple mm-wave parameters of a signal either transmitted, reflected, or emitted by mutually coupled metamaterial tracks will depend on the applied torque. Two or more mm-wave parameters of a same signal or of different signals may be evaluated simultaneously to discriminate the applied torque. Similarly, a single parameter of two or more signals may also be evaluated to discriminate the applied torque. Consequently, a measurement of all relevant variations can be used to improve the unambiguousness of the torque determination.

The torque measurement system 400 further includes a transceiver TRX 47 configured to transmit and receive mm-waves, or a transmitter 47*a* and a receiver 47*b* configured to transmit and receive mm-waves. The transmitter 47*a* and a receiver 47*b* may be placed such that the two rotatable target objects 41 and 42 and, thus, the two tracks 45 and 46, are arranged between the transmitter 47*a* and a receiver 47*b*.

The transceiver 47 includes a transmitter antenna configuration 48 configured to transmit a mm-wave beam (i.e., an electro-magnetic transmit signal) as a wireless electromagnetic signal focused at the two metamaterial tracks 45 and 46. The transmit antenna configuration 48 may include one antenna or multiple antennas that may be used to form one or more transmit antenna arrays. In the case that a separate transmitter 47*a* and receiver 47*b* is used, the transmitter 47*a* may be equipped with the transmitter antenna configuration 48.

The transceiver 47 also includes a receiver antenna configuration 49 configured to receive a partially-reflected mm-wave (i.e., an electro-magnetic receive signal) as a wireless electro-magnetic signal from both metamaterial tracks 45 and 46. It may also be implemented in a way where one antenna is used as a transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission. The receiver antenna configuration 49 may include one antenna or multiple antennas that may be used to form one or more receive antenna arrays.

In the case that a separate transmitter 47*a* and receiver 47*b* is used, the receiver 48*a* may be equipped with the receiver antenna configuration 49. Here, the torque measurement system 400 is configured to monitor mm-waves that pass through the two metamaterial tracks 45 and 46 instead of monitoring reflected mm-waves as was the case with the transceiver 47. As a result, the receiver antenna configuration 49 is configured to receive partially transmitted mm-waves (i.e., electro-magnetic receive signals) as a result of the transmitted mm-wave interacting with (i.e., being partially absorbed by and transmitted through) the metamaterial tracks 45 and 46.

It will further be appreciated that two transceivers, one for each metamaterial track, can be used. It will further be appreciated that two receiver and transmitter pairs, one for each metamaterial track, can be used instead of one or more transceivers. It may also be implemented in a way where one antenna is used as transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission.

Regardless of the configuration, it will be understood that at least one transmitter and at least one receiver is implemented for transmitting and detecting mm-wave beams. The transmitters and receivers may be electrically coupled to a system controller and/or a DSP.

As noted above, the two metamaterial tracks 45 and 46 are close enough that the tracks have a mutual coupling (e.g., an electric field coupling, a magnetic field coupling, or an electromagnetic field coupling) with each other thereby forming a resonant structure that results in a torque dependent shift of the transmission or the reflection that is caused by the resonant structure. The torque dependent mutual coupling between the metamaterial tracks 45 and 46 may be capacitive, inductive, or a combination thereof. In the latter case, one type of coupling may be dominant. For example, capacitive coupling between the two tracks may be dominant.

As an example, in the case that the two metamaterial tracks 45 and 46 are made up of elementary structures 15, the elementary structures 15 of the two metamaterial tracks 45 and 46 couple together to form a split ring resonator 18 as an elementary structure having two poles, which is a resonator whose poles are modified by the shift between the two layers caused by the applied torque. Thus, the mutual coupling characteristic between the two tracks 45 and 46 changes based on the rotational displacement the two tracks undergo as a result of the applied torque. As a result, one or more properties (e.g., amplitude and/or phase) of the signal emitted from the resonant multitrack structure formed by the two tracks changes based on the rotational displacement, which thus changes based on the applied torque.

In another example, the two metamaterial tracks 45 and 46 are made up of elementary structures 2, the elementary structures 2 of the two metamaterial tracks 45 and 46 couple together to form a stacked split ring resonator structure 17 having four pols (2 poles for each elementary structure 2), which is a resonator whose poles are modified by the shift between the two layers caused by the applied torque. Thus, the mutual coupling characteristic between the two tracks 45 and 46 changes based on the rotational displacement the two tracks undergo as a result of the applied torque. As a result, one or more properties (e.g., amplitude and/or phase) of the signal emitted from the resonant multitrack structure formed by the two tracks changes based on the rotational displacement, which thus changes based on the applied torque.

It will be appreciated that other combinations of elementary structures is possible, forming different types of mutually coupled structures that have one or more characteristics that change based on the rotational displacement caused by the applied torque.

It is also noted that the mm-wave, being an electromagnetic wave, has an electrical field component that stimulates the capacitance of a metamaterial track or the resonant multitrack structure and a magnetic field component that stimulates the inductance of a metamaterial track or the resonant multitrack structure. Each elementary structure reflects a part of the mm-wave directly, transmits a part of the mm-wave directly, and receives a part of the energy and stores it in its resonance oscillation. The oscillation caused by the transmission radiates a part of the energy in either direction. Thus, each metamaterial track absorbs part of the energy and stores it. Additionally, each metamaterial track eventually emits the energy that has been absorbed and stored.

The resonant multitrack structure, also referred to as a mutually coupled (multitrack) structure, may also be viewed as a single structure that emits a mm-wave, either as a reflection and/or a transmission, in response to the transmitted mm-wave from the transceiver 47 impinging thereon. This emitted wave has a torque dependent property that may be evaluated by the receiver circuit to determine the applied torque. For example, a phase shift and/or an amplitude shift of the received signal with respect to the transmitted mm-wave may be determined and evaluated to determine the applied torque.

In particular, when the shaft 44 rotates, there is a torque dependent shift in angular position (i.e., an angular shift) between the two metamaterial tracks 45 and 46 due to the torque applied to the shaft 44. For example, the target objects 41 and 42 rotate by different amounts due to the applied torque. As a result, the absolute angular position or discrete angular value corresponding to track 45 is different than the absolute angular position or discrete angular value corresponding to track 46, resulting in angular difference or angular shift that is proportional to the applied torque. The coupling effect between tracks 45 and 46 is torque-dependent and changes based on their angular shift resultant from the applied torque. This change in coupling in turn impacts at least one coupling-dependent property of a signal interacting with the mutually coupled structure, which can be measured to determine the applied torque.

A processor at the receiver is configured to receive at least one signal from the mutually coupled structure and determine the applied torque based on one or more evaluated properties of the at least one received signal. The processor may determine the applied torque based on the evaluated property or properties using, for example, a look-up table or an algorithm.

For example, the signal emitted by the mutually coupled structure formed by tracks 45 and 46 may have at least one property or combination of properties unique to the angular shift therebetween, and thus unique to the applied torque. This is referred to as a direct torque measurement.

Alternatively, the processor may receive signals from each track 45 and 46 of the mutually coupled structure, determine a torque-dependent absolute angular position corresponding to each track, determine the angular difference or shift therefrom, and then determine the applied torque based on the determined angular difference using, for example, a look-up table or an algorithm. In this case, the tracks 45 and 46 may have array structures that vary in the rotation direction, as described in reference to 3A-3G, so that the angular position of each track can be determined. This is referred to as an indirect torque measurement.

As an example for determining an absolute angular position or discrete angular value for a given metamaterial track, the transceiver 47 may transmit a continuous mm-wave as a carrier signal that has a constant frequency. Each metamaterial track that receives the carrier signal may partially reflect the signal back at the transceiver 47. The transceiver 47 includes a receiver circuit that includes two demodulators (e.g., two mixers), each configured to demodulate a received signal from a corresponding metamaterial track. Alternatively, the receiver circuit may include a multiplexer coupled to single demodulator that demodulates two received signals in a multiplexed manner. In any case, the receiver circuit is configured to determine a phase and/or an amplitude of each received signal, and compare the determined phase and/or amplitude to the phase and/or amplitude of the carrier signal, respectively, to derive the absolute angular position of the corresponding metamaterial track. A certain change in phase or amplitude relative to the carrier signal (i.e., a phase shift or an amplitude shift) corresponds to the absolute angular position of the corresponding metamaterial track. It is also possible for the receiver circuit to match the phase and/or amplitude differences of two received signals (i.e., one from each track 45 and 46) directly to the torque without calculating the absolute angular positions, via a mapping, look-up table, or the like, that maps differential values of phase and/or amplitude to different amounts of torque (i.e., torque values).

An applied torque for a given mutually coupled structure may be determined in a similar manner for a direct torque measurement. For instance, the transceiver 47 may transmit a continuous mm-wave as a carrier signal that has a constant frequency at the mutually coupled structure. The mutually coupled structure that receives the carrier signal may partially reflect the signal back at the transceiver 47. The mutual coupling between two metamaterial tracks of the mutually coupled structure depends on the applied torque, which is affects a torque dependent property of the reflected signal.

The transceiver 47 includes a demodulator that is configured to demodulate the received signal and a processor that is configured to evaluate a property of the received signal using at least one of phase analysis, amplitude analysis, or spectral analysis, and determine the applied torque based on the evaluated property.

In particular, the processor is configured to determine a phase and/or an amplitude of each received signal, and compare the determined phase and/or amplitude to the phase and/or amplitude of the carrier signal, respectively, to derive the applied torque. A certain change in phase or amplitude relative to the carrier signal (i.e., a phase shift or an amplitude shift) corresponds to the applied torque.

In summary, the torque measurement system 400 uses two target objects (i.e., two carrier structures) 41 and 42 each with a metamaterial pattern 45 and 46 on their neighboring surfaces. Each carrier structure is fixed to a shaft 44 within a certain distance between the neighboring carrier structures. If a torque is applied to the shaft 44, the shaft 44 winds depending on its thickness and its Young's modulus. The distance between the carrier structures is close enough to ensure that the two metamaterial tracks 45 and 46 mutually couple. Depending on the shift of the two metamaterial patterns of the two metamaterial tracks, the coupling effect between the two metamaterial tracks changes. This coupling effect is unique to the amount of applied torque. As a result, the change in the coupling effect causes a property of one or more signals emitted from the metamaterial tracks 45 and 46 to be altered, which can be measured and analyzed for determining the applied torque.

Figure 4B:
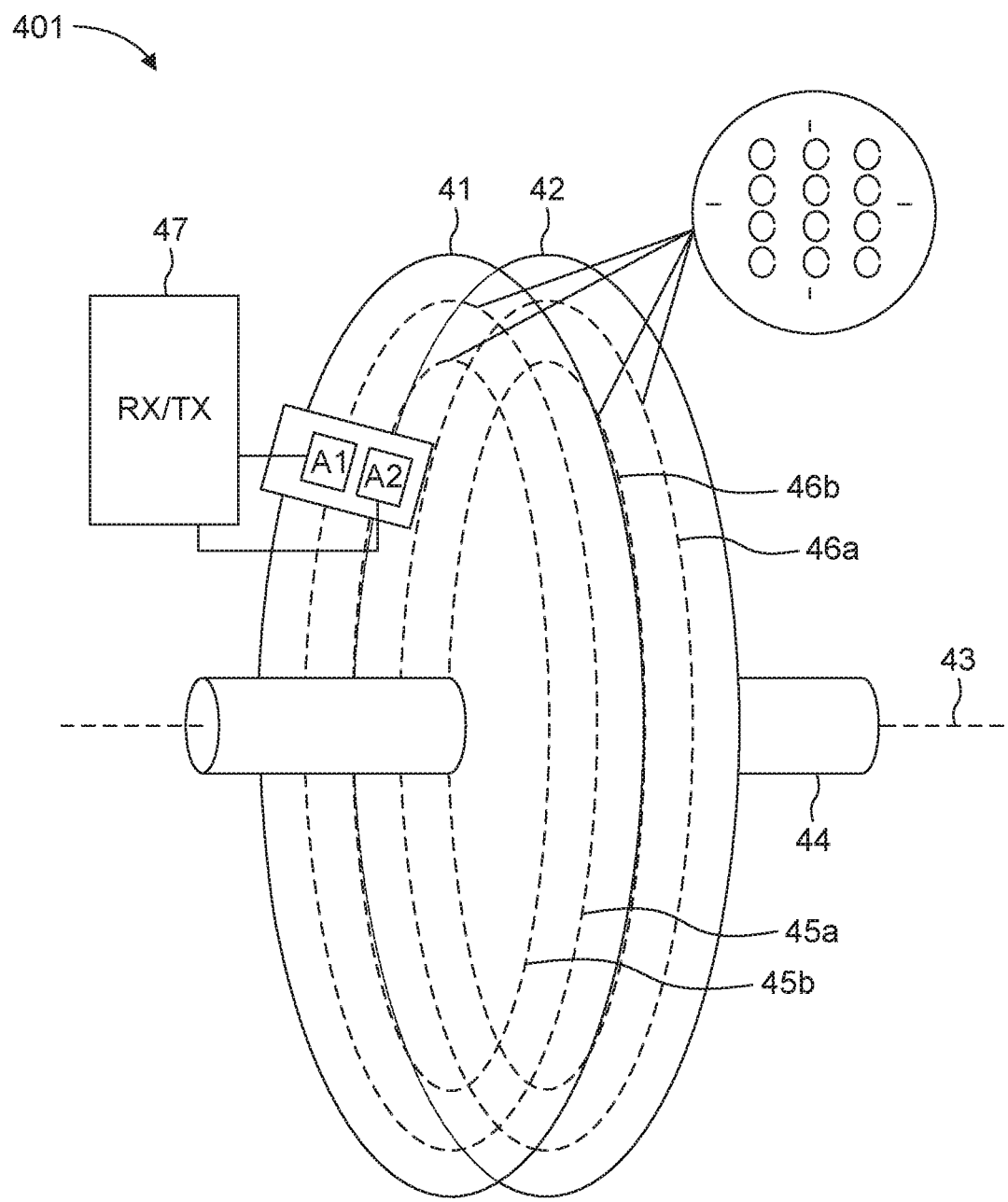
FIG. 4B is a schematic view of another torque measurement system according to one or more embodiments.

FIG. 4B is a schematic view of a torque measurement system 401 according to one or more embodiments. The torque measurement system 401 is similar to the torque measurement system 400 depicted in FIG. 4A, with the exception that the torque measurement system 401 includes additional metamaterial tracks on each rotatable target object 41 and 42. Two metamaterial tracks 45a and 45b are attached to rotatable target object 41 and two metamaterial tracks 46a and 46b are attached to rotatable target object 42. The two mm-wave metamaterial tracks 45a and 45b attached to rotatable target object 41 are concentric loops located at different distances from the rotational axis 43. Similarly, the two mm-wave metamaterial tracks 46a and 46b attached to rotatable target object 42 are concentric loops located at different distances from the rotational axis 43.

Furthermore, metamaterial tracks 45a and 46a are aligned (i.e., are located at the same radial distance from the rotational axis 43) and are in close proximity such that they are mutually coupled. Similarly, metamaterial tracks 45b and 46b are aligned (i.e., are located at the same radial distance from the rotational axis 43) and are in close proximity such that they are mutually coupled. Thus, two mutually coupled structures are formed, where the first one is formed by tracks 45a and 46a, and the second one is formed by tracks 45b and 46b.

In addition, the torque measurement system 401 includes two antennas A1 and A2 both configured to transmit and receive mm-wave signals. Here, antenna A1 is aligned with metamaterial tracks 45a and 46a, and, as such, is configured to transmit a mm-wave beam at those mutually coupled tracks and receive reflected signals therefrom. Similarly, antenna A2 is aligned with metamaterial tracks 45b and 46b, and, as such, is configured to transmit a mm-wave beam at those mutually coupled tracks and receive reflected signals therefrom.

As a result, different regions of metamaterial tracks can be arranged on the carrier structures and provide a different measurements. Preferably, the different regions at which the metamaterial tracks on a same carrier structure are attached are spaced in a way that the coupling between an inner rings and an outer ring is negligible compared to the coupling between the rings on the different carrier structures. For example, tracks 45a and 46a are strongly coupled by a field effect, whereas tracks 45a and 45b are weakly coupled or not coupled by a field effect. For this reason, tracks 45a and 46a may form a first coupled pair of tracks and tracks 45b and 46b may form a second coupled pair of tracks.

An antenna A1 or A2 is associated to each mutually coupled structure. Preferably the antennas A1 and A2 should have a directional characteristic that focusses their transmission and reception on the associated rings of the metamaterial structures. Thus, antenna A1 has a directional characteristic associated with tracks 45a and 46a (i.e., a first mutually coupled structure), and antenna A2 has a directional characteristic associated with tracks 45b and 46b (i.e., a second mutually coupled structure).

In case of identical patterns of elementary structures, the displacement of the elementary structures on both carrier structures will be different due to the different radius (d1=r1*da; d2=r2*da). Consequently, the change of the mm-wave property is lower on the inner track than on the outer track. In other words, a same angle shift of the shaft 44 causes a different change in the coupling of the two pairs of coupled tracks, resulting in two different signal modulations (i.e., amplitude and/or phase) in the receive signals generated by the different coupled pair of tracks.

The receiver circuit of transceiver 47 may then use a differential measurement to discriminate the applied torque which is more robust against external factors such as the influence of distance changes. For example, the receiver circuit may use signals received from the two mutually coupled structures to perform a differential measurement of the applied torque via a differential algorithm applied to the two signals.

Figure 4C:
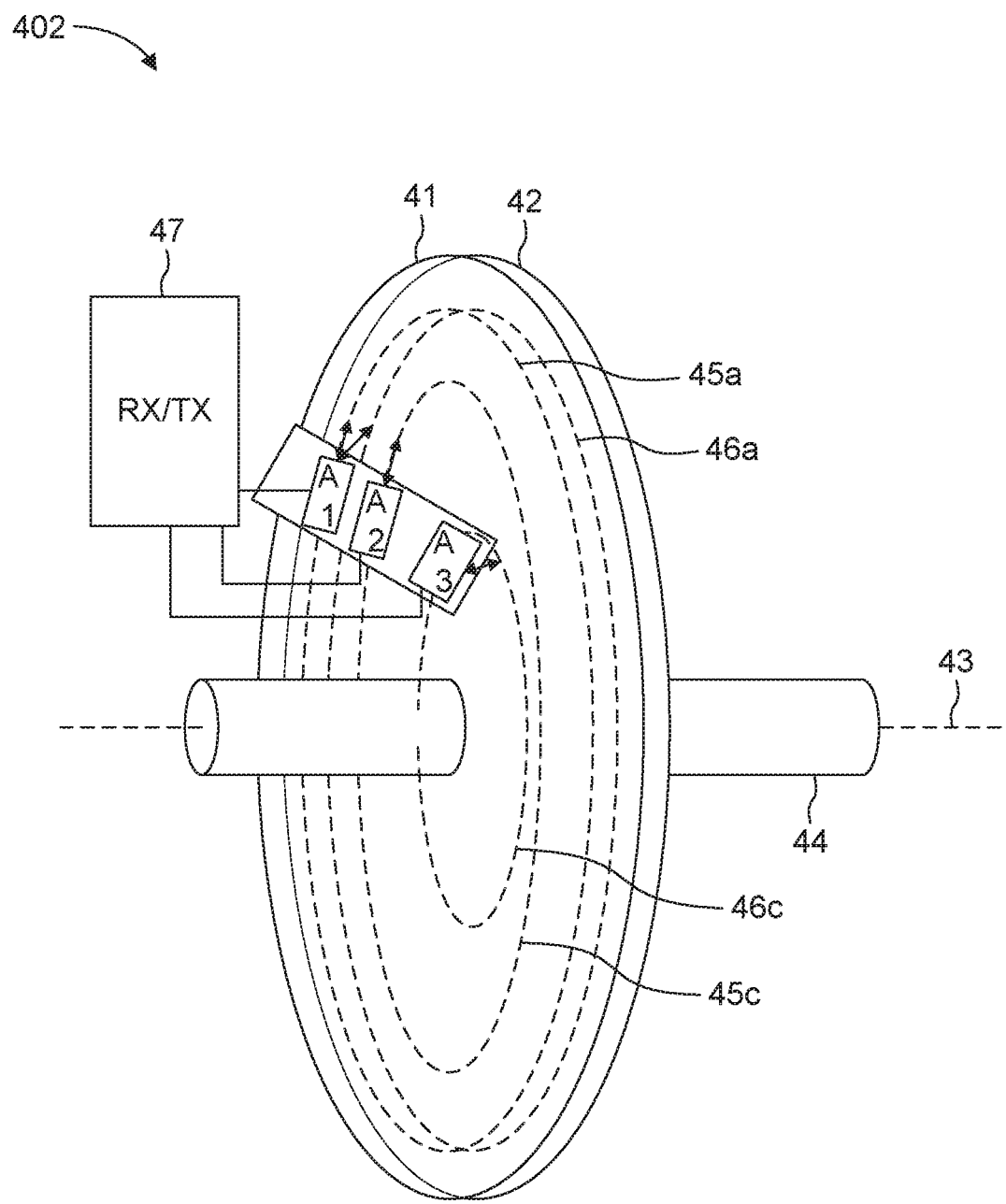
FIG. 4C is a schematic view of another torque measurement system according to one or more embodiments.

FIG. 4C is a schematic view of a torque measurement system 402 according to one or more embodiments. The torque measurement system 402 is similar to the torque measurement system 400 depicted in FIG. 4A, with the exception that the torque measurement system 402 includes additional metamaterial tracks on each rotatable target object 41 and 42. Two metamaterial tracks 45a and 45c are attached to rotatable target object 41 and two metamaterial tracks 46a and 46c are attached to rotatable target object 42. Thus, a single mutually coupled structure is formed by tracks 45a and 46a.

The two mm-wave metamaterial tracks 45a and 45c attached to rotatable target object 41 are concentric loops located at different distances from the rotational axis 43. Similarly, the two mm-wave metamaterial tracks 46a and 46c attached to rotatable target object 42 are concentric loops located at different distances from the rotational axis 43. Furthermore, tracks 45c and 46c are located at different distances from the rotational axis 43 such that mutual coupling therebetween is weak or zero.

This arrangement is similar to the torque measurement system 401 depicted in FIG. 4B, except the additional tracks 45c and 46c are not mutually coupled to each other or to any other track as is the case with tracks 45b and 46b. Instead, tracks 45c and 46c are reference metamaterial tracks for their respective target object (i.e., carrier structure) 41 or 42 and may be used to determine an absolute angular position of its respective target object 41 or 42.

Tracks 45c and 46c may both have an array of structures that has at least one property that changes in the rotation direction, as explained above in reference to FIGS. 3A-3G. Thus, the characteristic or property of the metamaterial at a specific position along the track results an angle-dependent behavior or interaction with an mm-wave, where the angle-dependent behavior or interaction is an angle-dependent reflection, angle-dependent absorption, angle-dependent transmission, or an angle-dependent combination thereof. Since multiple of the metamaterial properties are changing simultaneously, multiple mm-wave parameters of a signal either transmitted, reflected, or emitted by a metamaterial track will depend on the rotational angle. Two or more mm-wave parameters of a same signal or of different signals may be evaluated simultaneously to discriminate the rotational position. Similarly, a single parameter of two or more signals may also be evaluated to discriminate the rotational position. Consequently, a measurement of all relevant variations can be used to improve the unambiguousness of the angle determination.

Here, three antennas A1, A2, and A3 are utilized, each having a directional characteristic that focusses their transmission and reception on the one or more associated rings of the metamaterial structures. Thus, antenna A1 has a directional characteristic associated with tracks 45a and 46a, antenna A2 has a directional characteristic associated with track 45c, and antenna A3 has a directional characteristic associated with track 46c Thus, there is an additional metamaterial track 45c, read by antenna A2, that is added on the front carrier structure 41 without a coupling track on the backside carrier structure 42, and an additional metamaterial track 46c, read by antenna A3, that is added to the backside carrier structure 42 without a coupling to the front side carrier structure 41. Consequently, the mm wave properties of those reference tracks 45c and 46c are not influenced by the displacement of the two carrier structures relative to each other due to mutual coupling and are therefore torque independent. Whereas, the mutual coupling between tracks 45a and 46a and the mutual coupling between tracks 45b and 46b are torque dependent.

These reference tracks 45c and 46c can be used by the receiver circuit of the transceiver 47 as references for measurements that can be used to eliminate influences resulting from the setup, e.g., variations of the distance between the antennas and the distance between the two carrier structures 41 and 42.

For example, the receiver circuit of the transceiver 47 may be configured to determine a torque-independent absolute angular position of the carrier structure 41 by analyzing an amplitude modulation or a phase modulation of a receive signal received from track 45c at antenna A2 in reference to a carrier signal transmitted by the antenna A2 based on methods described above. The receiver circuit may use the torque-independent absolute angular position as the actual absolute angular position of the carrier structure 41, which may be further used to calculate the rotational speed thereof. Additionally, the receiver circuit may use the torque independent absolute angular position to detect preexisting errors in the set up and compensate the torque dependent measurements.

Similarly, the receiver circuit of the transceiver 47 may be configured to determine a torque independent absolute angular position of the carrier structure 42 by analyzing an amplitude modulation or phase modulation of a receive signal received from track 46c at antenna A3 in reference to a carrier signal transmitted by the antenna A3 based on methods described above. The receiver circuit may use the torque independent absolute angular position as the actual absolute angular position of the carrier structure 42, which may be further used to calculate the rotational speed thereof. Additionally, the receiver circuit may use the torque independent absolute angular position to detect preexisting errors in the set up and compensate the torque dependent measurements.

In addition, the torque independent structures may also be angle independent. For example, tracks 45c and 46c may have a homogeneous pattern, such as the one shown in FIG. 2A, with known behavior for the measurement of the distance between the track and the antenna.

Figure 5:
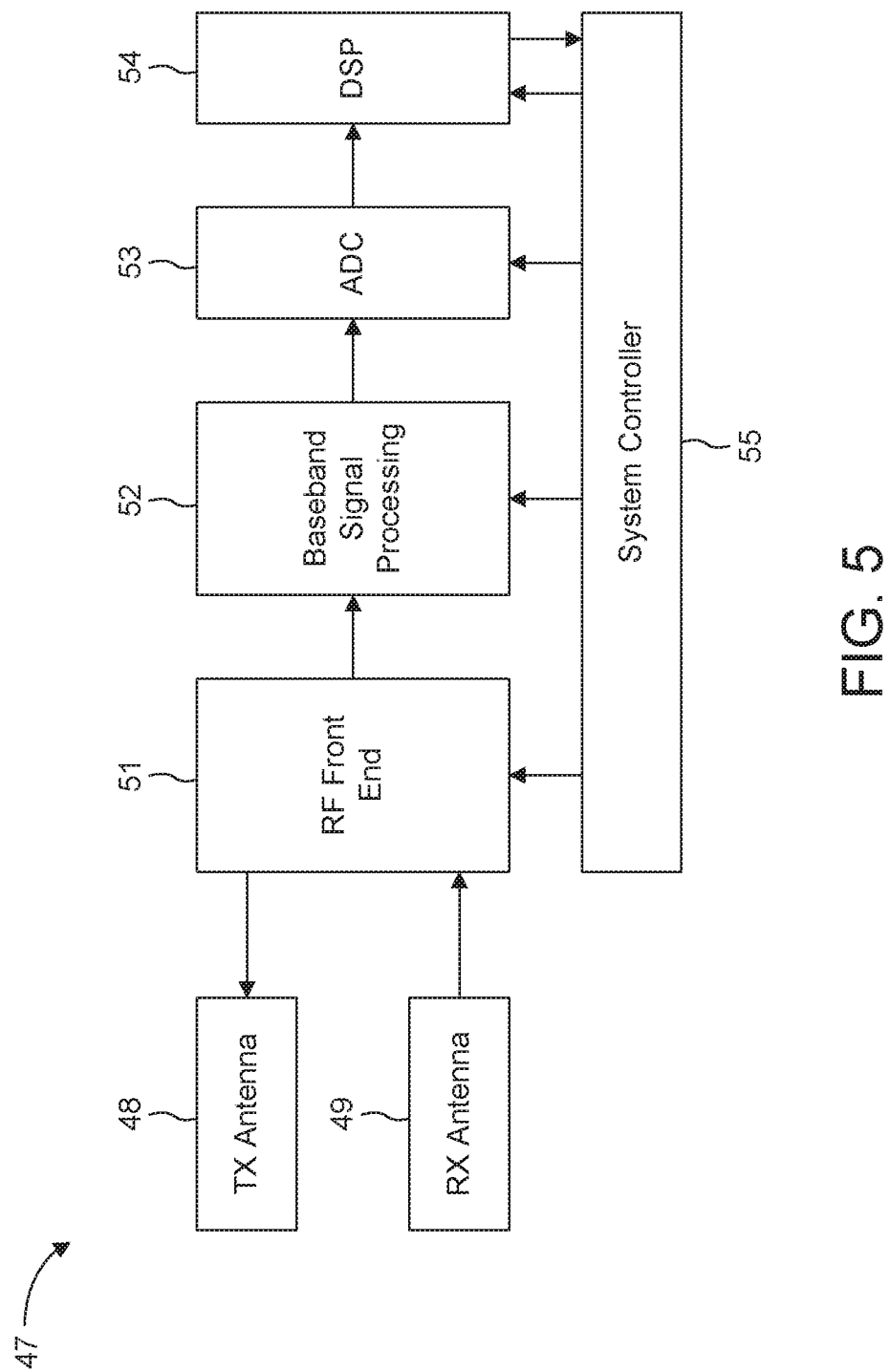
FIG. 5 is a block diagram that illustrates a transceiver circuit of the transceiver according to one or more embodiments.

FIG. 5 is a block diagram that illustrates a transceiver circuit of the transceiver 47 according to one or more embodiments. The transceiver 47 includes relevant transmission circuitry and receiver circuitry to the embodiments described herein. It will also be appreciated that relevant transmission circuitry and receiver circuitry may be divided between the transmitter 47a and receiver 47b according to implementation.

Frequency modulation may be used on the transmitter side to characterize the transfer function of the transmission channel including the metamaterial over frequency. However, a continuous carrier wave with a constant frequency may also be used.

On the measurement side (receiver side), it would still be magnitude (amplitude) and phase or I and Q, which would be the most sophisticated and flexible solution. However, with respect to cost, a system with a constant frequency carrier may be preferable. In this case, the frequency is chosen to be in a defined region with respect to the poles and zeros where the phase or amplitude transfer function has a monotonous behavior with respect to the modified property of the metamaterial. Then a local measurement of phase shift or amplitude attenuation is used.

Accordingly, at least one transmission antenna 48 (TX antenna configuration) and a receiver antenna 49 (RX antenna configuration) are connected to an RF front end 51 integrated into a chip, which front end may contain all those circuit components that are required for RF signal processing. These circuit components comprise for example a local oscillator (LO), RF power amplifiers, low noise amplifiers (LNA), directional couplers (for example rat-race couplers, circulators, etc.), and mixers for downmixing (or downconverting) the RF signals into baseband or an intermediate frequency band (IF band). The RF front end 51 may—possibly together with further circuit components—be integrated into a chip, which is usually referred to as a monolithic microwave integrated circuit (MMIC).

The example illustrated shows a bistatic (or pseudo-monostatic) radar system with separate RX and TX antennas. In the case of a monostatic radar system, a single antenna would be used both to emit and to receive the electromagnetic (radar) signals. In this case, a directional coupler (for example a circulator) may be used to separate the RF signals to be emitted from the received RF signals (radar echo signals). Radar systems in practice usually have a plurality of transmission and reception channels (TX/RX channels) with a plurality of TX and RX antennas, which makes it possible, inter alia, to measure the direction (DoA) from which the radar echoes are received. In such multiple-input multiple-output (MIMO) systems, the individual TX channels and RX channels in each case usually have an identical or similar structure.

In the case of a frequency modulated continuous wave (FMCW) radar system, the RF signals emitted by the TX antenna configuration 48 may be for example in the range of approximately 10 GHz to 1 THz. However, the frequency bands that are applied here depend on the structures to be used for the generation of the metamaterial target. As mentioned, the RF signal received by the RX antenna configuration 49 comprises the radar echoes (chirp echo signals), that is to say those signal components that are backscattered at one or at a plurality of radar targets. The received RF signal is downmixed for example into baseband (or an IF band) and processed further in baseband by way of analog signal processing (see analog baseband signal processing chain 52).

The analog signal processing circuitry 52 essentially comprises filtering and possibly amplifying the baseband signal. The baseband signal is finally digitized (see analog-to-digital converter 53) and processed further in the digital domain. The digital signal processing chain may be implemented at least partly in the form of software that is able to be executed on a processor, for example a microcontroller, a digital signal processor (DSP) 54, or another computer unit.

The overall system is generally controlled by way of a system controller 55 that may likewise be implemented at least partly in the form of software that is able to be executed on a processor, such as for example a microcontroller. The RF front end 51 and the analog baseband signal processing chain 52 (optionally also the analog-to-digital converter 53) may be integrated together in a single MMIC (that is to say an RF semiconductor chip). As an alternative, the individual components may also be distributed over a plurality of integrated circuits.

The DSP 54 is configured to analyze a phase shift or an amplitude shift of one or more signals received from a mutually coupled structure to determine the applied torque. The DSP 54 is configured to perform the aforementioned phase analysis, amplitude analysis, and/or spectral analysis to determine an applied torque based on the determined amplitude modulation and/or phase modulation. The phase modulation of a received signal may be a phase shift of the received signal with respect to a phase of the transmitted mm-wave. Similarly, the amplitude modulation of a received signal may be an amplitude shift of the received signal with respect to an amplitude of the transmitted mm-wave. The DSP 54 may be configured to determine a phase shift and/or an amplitude shift of a received signal and translate the shift into an angular shift between tracks 45 and 46 resultant from the applied torque to calculate the applied torque or directly translate the phase shift and/or an amplitude shift to the applied torque. For example, the DSP 54 may refer to a look-up table provided in memory that stores torque values relative to a specific amplitude modulation and/or phase modulation.

In addition, the DSP 54 may receive signals from two different mutually coupled structures, calculate a differential measurement value from the signals, and determine the applied torque based on the differential measurement value, for example, by using a look-up table in which differential measurement values are correlated to different applied torques.

In addition, the DSP 54 may receive signals from reference tracks (e.g., reference tracks 45c and 46c), analyze an amplitude shift and/or a phase shift for each receive signal with respect to its corresponding transmitted signal, and determine an absolute angular position of each reference track as described herein. The DSP 54 may also calculate the rotational speed by analyzing the rate of change in the angular values. Additionally, by obtaining two measurement signals (e.g., two 90° phase shifted signals) for at least one of the reference tracks, a rotation direction of the rotatable target object may also be determined by the DSP 54. In general, two signals may be required to achieve a 360° unambiguous measurement range. For a system measuring in a limited range the property of the metamaterial must not necessarily be changed according to a sine/cosine system. For a limited range (e.g. +/−60°), a sine alone would be sufficient.

FIGS. 6A-6D are schematic views of various antenna configurations in a torque measurement system according to one or more embodiments. The antenna configurations may be used in any of the described embodiments, alone or in combination. The antenna configurations include transceivers 60a-60d, respectively, which use similar transmitter circuitry and receiver circuitry described in reference to transceiver 47.

Figure 6A:
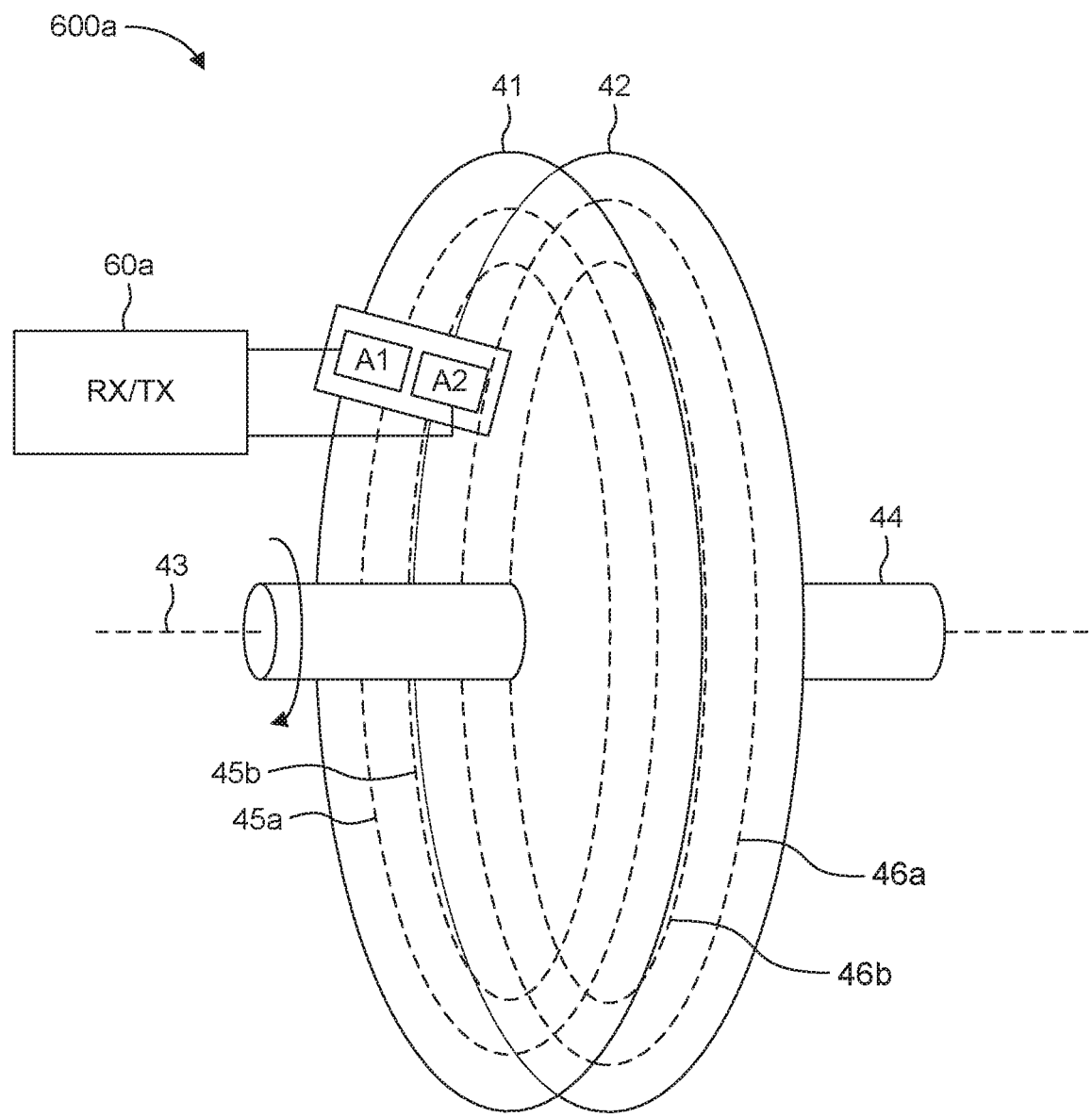
FIGS. 6A-6D are schematic views of various antenna configurations in a torque measurement system according to one or more embodiments.

In FIG. 6A, similar to the arrangement shown in FIG. 3B, the torque measurement system 600a includes a transceiver 60a electrically coupled to two antennas A1 and A2 that are arranged in proximity to (i.e., coupled to via a coupling effect) a respective metamaterial track 45a or 45b. In this case, each antenna A1 and A2 is configured to transmit a mm-wave beam and receive reflected mm-wave beams from its respective pair of mutually coupled metamaterial tracks to perform a measurement thereon. Thus, antenna A1 has a directional characteristic associated with tracks 45a and 46a, and antenna A2 has a directional characteristic associated with tracks 45b and 46b. The transceiver 60a includes a directional coupler in order to perform transmission and reception via a same antenna.

Figure 6B:
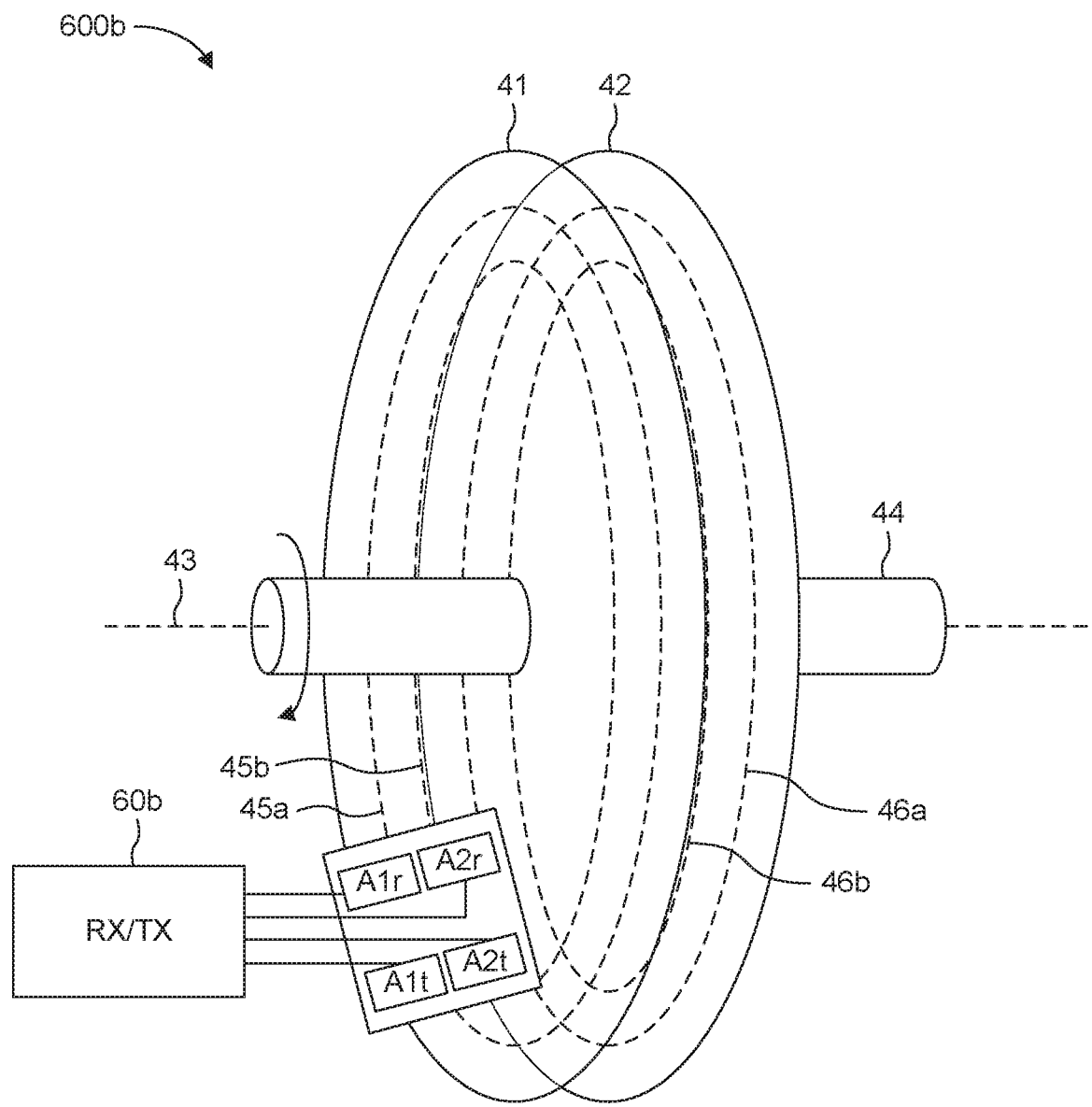

In FIG. 6B, the torque measurement system 600b includes a transceiver 60b electrically coupled to a pair of transmission antennas A1t-A2t and a pair of receiver antennas A1r-A2r (i.e., four antennas in all). This arrangement is similar to the arrangement shown in FIG. 6A, except separate antennas are used for transmitting and receiving mm-waves.

Figure 6C:
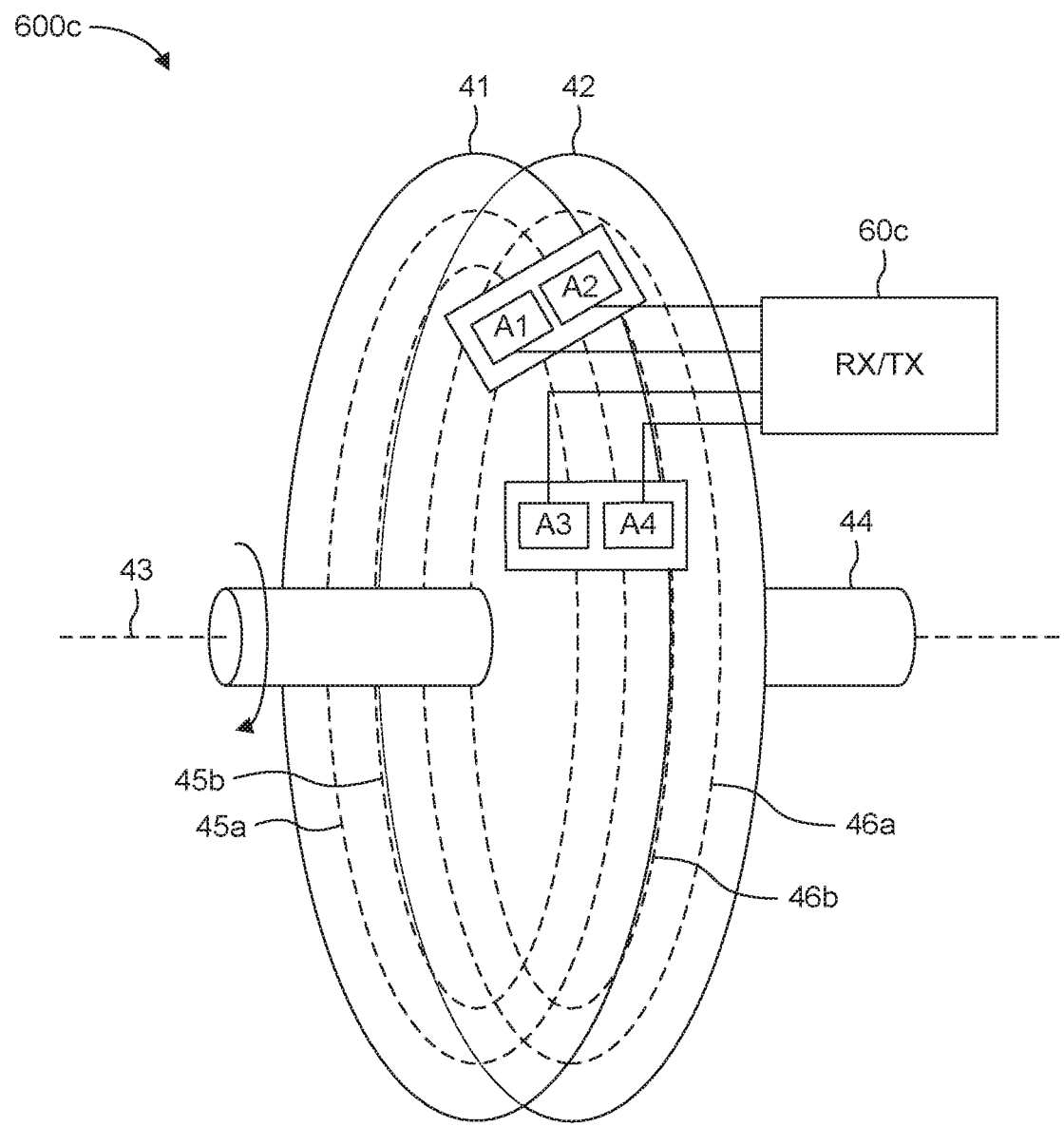

In FIG. 6C, the torque measurement system 600c includes a transceiver 60c electrically coupled to two pairs of antennas A1-A2 and A3-A4 (i.e., four antennas in all). Each antenna pair has one antenna arranged in proximity to (i.e., coupled to via a coupling effect) a respective metamaterial track 45a and 45b. Thus, two antennas (e.g., A1-A3 and A2-A4) are coupled to each mutually coupled structure. Antenna A1/A2 couple into their respective mutually coupled structure, which acts as a transmission line, and antennas A3/A4 couple the signal out again (at least partly).

As a result, antenna A1 transmits a signal into tracks 45b and 46b, tracks 45b and 46b, as a mutually coupled structure, act as a transmission line and transmit the signal along the mutually coupled structure, where antenna A3 picks up (i.e., couples out) the transmitted signal having an altered property due to the transmission along the mutually coupled structure.

Similarly, antenna A2 transmits a signal into tracks 45a and 46a, tracks 45a and 46a, as a mutually coupled structure, act as a transmission line and transmit the signal along the mutually coupled structure, where antenna A4 picks up (i.e., couples out) the transmitted signal having an altered property due to the transmission along the mutually coupled structure.

Thus, a transmitted signal couples into a respective mutually coupled structure which acts as transmission line and in a larger distance (i.e., several elementary metamaterial structure sizes) a receive antenna extracts a part of the energy from the respective mutually coupled structure.

Figure 6D:
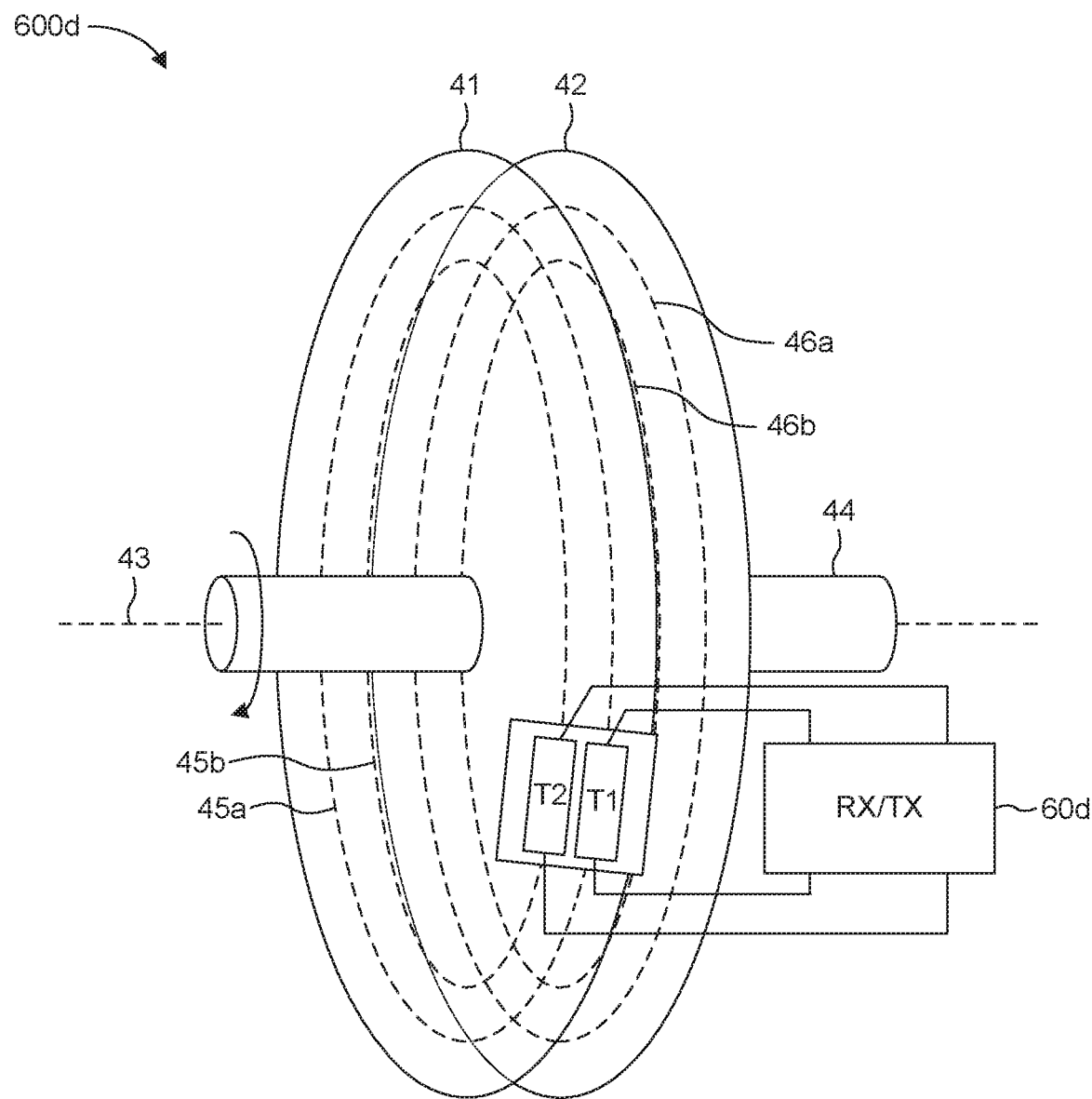

In FIG. 6D, the torque measurement system 600d includes a transceiver 60d electrically coupled to two transmission lines T1 and T2 that are each in proximity (i.e., coupled to via a coupling effect) a respective mutually coupled structure (i.e., mutually coupled structure 45a/46a or mutually coupled structure 45b/46b). The transmission lines T1 and T2 are substantially parallel with a segment of its respective mutually coupled structure. Transmission lines T1 and T2 carry an electromagnetic wave from the transceiver 60d and the respective mutually coupled structure is in the region of the electromagnetic field surrounding the transmission line (e.g., a plastic fiber). The torque dependent coupling effect between two mutually coupled tracks (i.e., tracks 45a/46a or tracks 45b/46b) influences the mm-wave impedance of the transmission line or partly couples energy out before it reaches the other end of the transmission line. This influence is unique to the angular displacement between the two carrier structures 41 and 42 and thereby corresponds to the applied torque.

Figure 7:
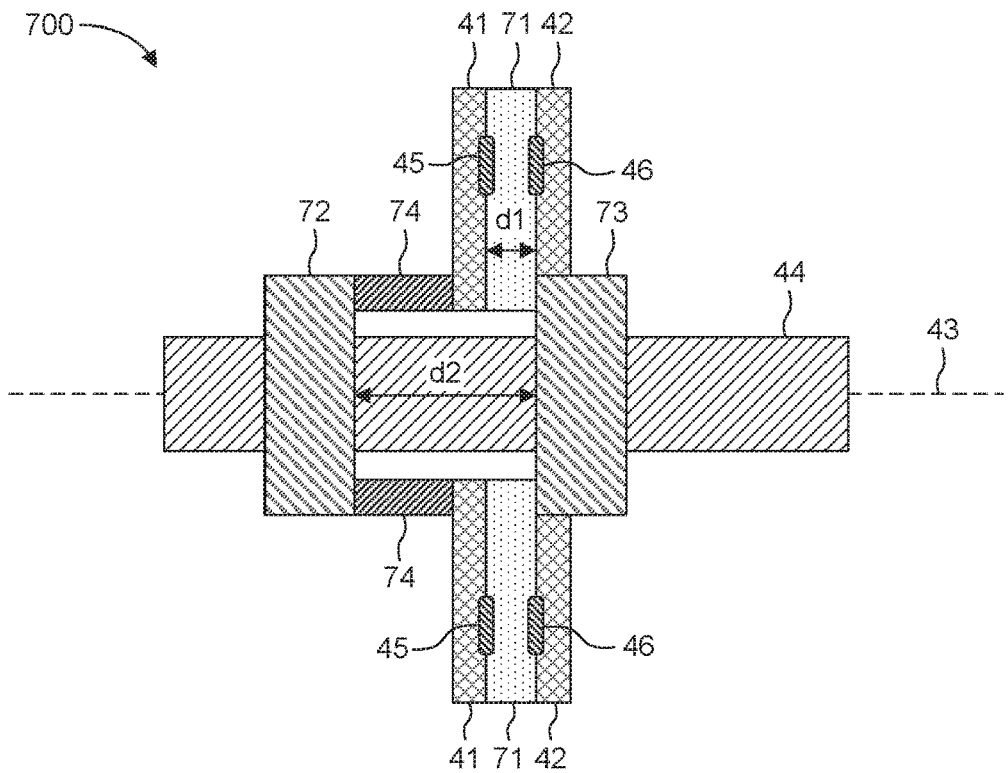
FIG. 7 is a cross-sectional view of a torque measurement system according to one or more embodiments.

FIG. 7 is a cross-sectional view of a torque measurement system 700 according to one or more embodiments. The torque measurement system 700 includes two carrier structures 41 and 42 fixed to a shift 44 at a predetermined distance apart as similarly described above. The torque measurement system 700 also includes two mutually coupled metamaterial tracks 45 and 46 as similarly described above. The structure of the torque measurement system 700 is fabricated to ensure alignment of the two tracks 45 and 46 as a predetermined distance apart such that the two tracks are ensured to have a certain position relation with each other and a desired mutual coupling therebetween is achieved.

Mechanically, two mutually coupled metamaterial tracks on different carrier structures have to be fixed to the shaft 44 with a certain distance, since the winding angle under an applied torque increases proportionally with respect to the length of the shaft between the two mutually coupled metamaterial tracks. On the other hand, the two mutually coupled metamaterial tracks need to be within a coupling distance. Furthermore, the mechanical arrangement has to fix the metamaterial tracks in a defined zero-torque starting position (i.e., a reference position) with respect to each other so that a change from the zero-torque starting position can be measured. Possible constructions are shown in FIGS. 7-10.

In FIG. 7, a flexible spacer 71 is interposed between the two carrier structures 41 and 42 and fixedly coupled (mechanically) thereto. The flexible spacer 71 defines the distance d1 between two carrier structures 41 and 41. Thus, the flexible spacer 71 also defines the distance d1 between the two tracks 41 and 42. Here, "flexible" means that the "torque resistance" or "stiffness" of the flexible spacer 71 is significantly lower than the torque resistance or stiffness of the shaft 44. For example, the shaft 44 may be made of steel and the flexible spacer 71 may be made of plastic (i.e., a material more flexible or less stiff than steel). Furthermore, the flexible spacer 71 may also be more flexible than the carrier structures to which it is mechanically coupled.

The flexible spacer 71 may be removed after assembly of each carrier structure onto the shaft.

The flexible spacer 71 may be replaced by a number of discrete space springs (e.g., small steel cantilevers) equally distributed around the circumference of the carrier structures 41 and 42. Thus, instead of a solid spacer material, local springs or pillars of spacer material may be distributed around the shaft. Thus, even if the flexible spacer 71 and the carrier structures are made of the same material or a material stiffer than the carrier structure, the flexible spacer 71 overall would be more flexible than the carrier structures due to it being made of local springs or pillars that increase the flexibility of the flexible spacer 71.

In addition, the torque measurement system 700 includes two fixtures 72 and 73 each configured to fixedly couple (mechanically) a corresponding carrier structure 41 or 42 to the shaft 44. Both fixtures 72 and 73 are mechanically coupled to the shaft 44 and represent a point of attachment of the carrier structures 41 and 42 to the shaft 44. As can be seen, fixture 73 fixedly couples (mechanically) carrier structure 42 directly to the shaft 44. Fixture 72 may also be used to fixedly couples (mechanically) carrier structure 41 directly to the shaft 44. However, in this example, an optional spacer ring 74 is used to fixedly couple (mechanically) the fixture 72 to the carrier structure 41. Each fixture 72 and 73 and the optional spacer ring 74 may be made of a stiff material, such as steel.

By using the optional spacer ring 74, a larger distance d2 on the shaft 44 is achieved at which the carrier structures 41 and 42 are attached. The larger distance d2 results in a larger angular shift between carrier structures as a result of an applied torque than if the carrier structures 41 and 42 were attached to the shaft 44 at the distance d1. The angular shift between carrier structures 41 and 42 is proportional to the lateral distance at which they are attached to the shaft 44. thus, the larger distance d2 causes a more pronounced angular shift between carrier structures 41 and 42. This in turn causes a larger shift in mm-wave properties in a receive signal detected at the receiver circuit that is easier to detect, measure, and translate into a torque value corresponding to the applied torque.

Figure 8:
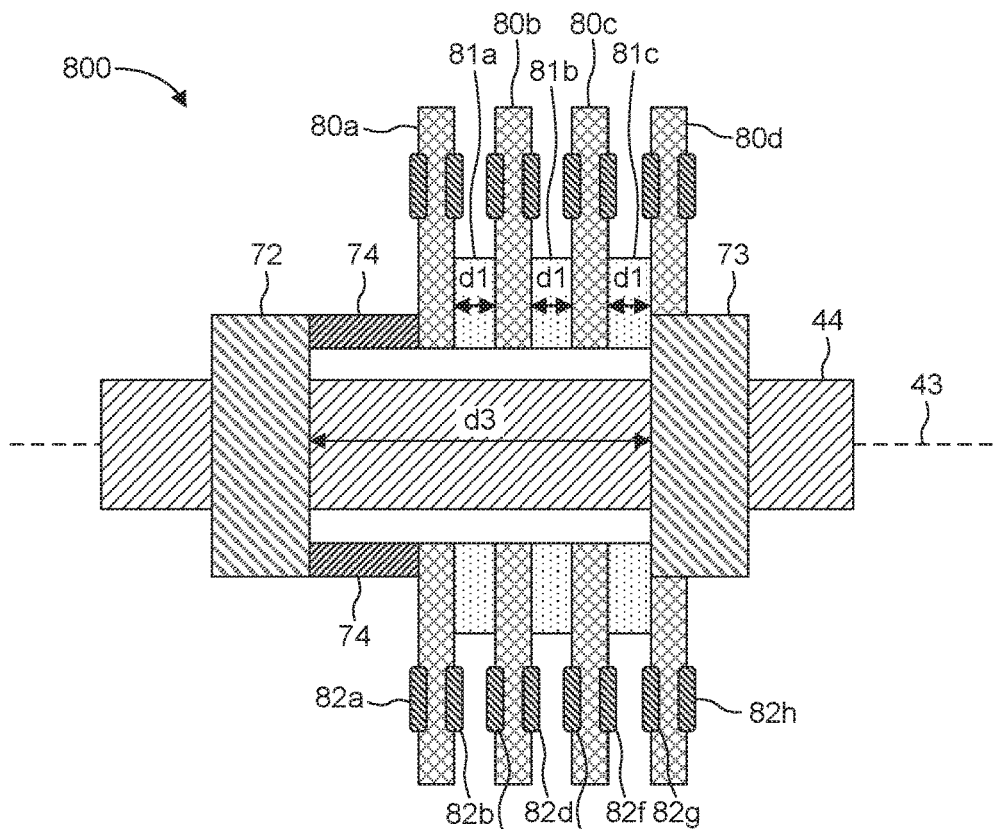
FIG. 8 is a cross-sectional view of another torque measurement system according to one or more embodiments.
Figure 9:
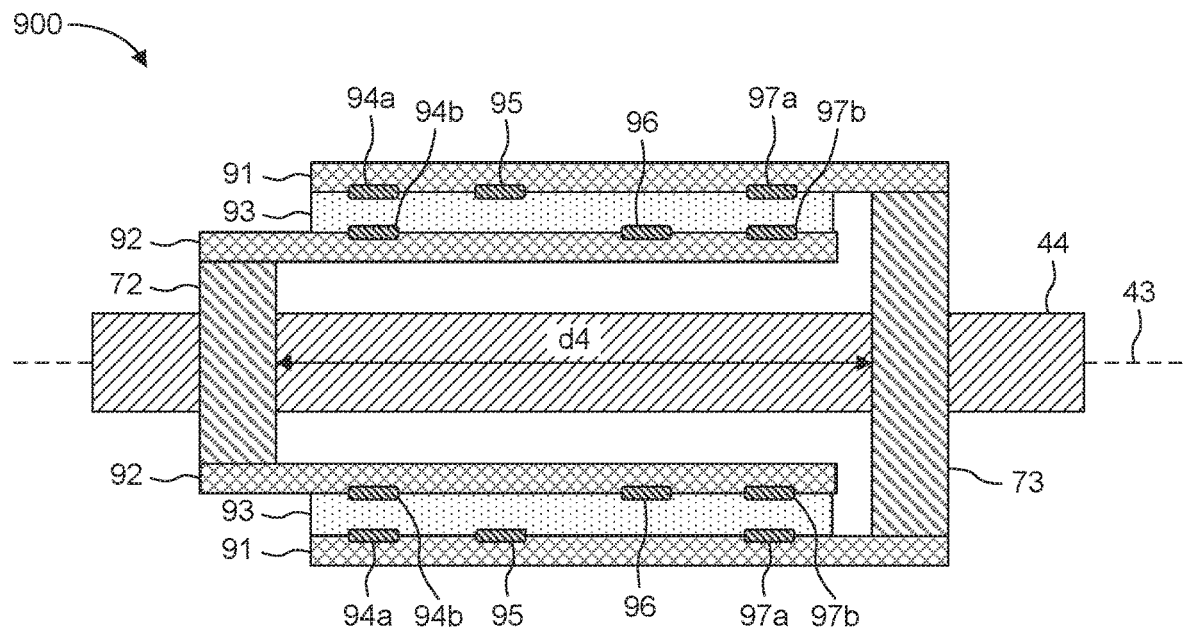
FIG. 9 is a cross-sectional view of another torque measurement system according to one or more embodiments.
Figure 10:
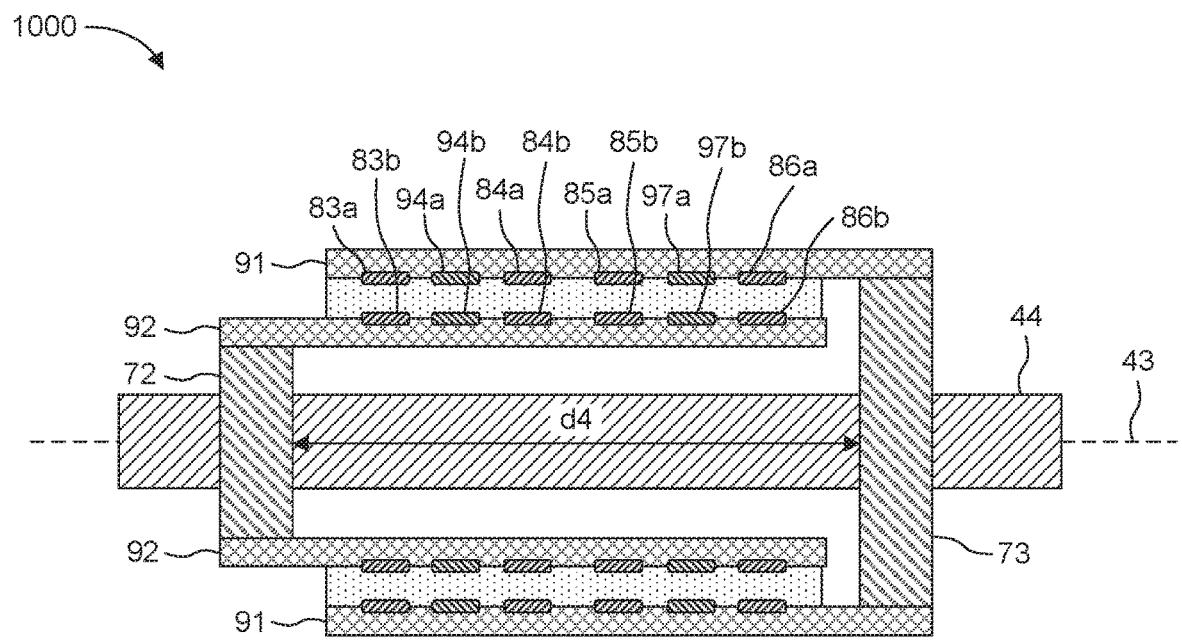
FIG. 10 is a cross-sectional view of another torque measurement system according to one or more embodiments.

FIGS. 8-10 provide additional variants to the construction. FIG. 8 is a cross-sectional view of a torque measurement system 800 according to one or more embodiments. The torque measurement system 800 includes multiple layers of carrier structures and flexible spacers. Here, the torque measurement system 800 includes four carrier structures 80a-80d fixed to a shift 44 at a predetermined distance apart from each other, which flexible spacers 81a-81c interposed between, respectively.

In addition, a pair of metamaterial tracks are attached to each carrier structure. Thus, eight metamaterial tracks 82a-82h are provided, where each track is mutually coupled to one or more neighboring tracks via a field effect.

As can be seen, the flexible spacers 81a-81c only extend to an inner diameter portion of the carrier structures 80a-80d and do not extend to an outer diameter portion of the carrier structures 80a-80d where the metamaterial tracks 82a-82h are located. Here, only air, which has no significant absorption or damping characteristic, is present between the metamaterial tracks 82a-82h.

Fixtures 72 and 73 are separated along the shaft 44 by a distance d3.

FIG. 9 is a cross-sectional view of a torque measurement system 900 according to one or more embodiments. In this case, the torque sensor structure may include nested cylinders 91 and 92 as carrier structures instead of discs with a flexible spacer 93 in-between. Carrier structure 91 is mechanically fixed to the shaft 44 by fixture 73 and carrier structure 92 is mechanically fixed to the shaft 44 by fixture 72, where fixtures 72 and 73 are separated along the shaft 44 by a distance d4.

The torque measurement system 900 additionally includes six metamaterial tracks 94a, 94b, 95, 96, 97a, and 97b. Tracks 94a and 94b represent a first mutually coupled structure that have a torque dependent mutual coupling due to a field effect acting thereon. Similarly, tracks 97a and 97b represent a second mutually coupled structure that have a torque dependent mutual coupling due to a field effect. The two mutually coupled structures are provided as redundant measurement channels for functional safety.

Tracks 95 and 96 are torque independent reference tracks for their respective carrier structure 91 and 92, and may be angle dependent or independent. Thus, tracks 95 and 96 are used in a similar manner described above in reference to tracks 45c and 46c. For example, track 95 may be used to measure a torque independent angular position of carrier structure 91 and track 96 may be used to measure a torque independent angular position of carrier structure 92.

FIG. 10 is a cross-sectional view of a torque measurement system 1000 according to one or more embodiments. The torque sensor structure of system 1000 has a similar construction to that shown in FIG. 9, except RF shields are provided on both sides of each mutually coupled structure. In particular, RF shields 83a, 83b, 84a, 84b, 85a, 85b, 86a, and 86b (i.e., isolation tracks) are provided in pairs and are each adjacent to a respective metamaterial track 94a, 94b, 97a, or 97b. The RF shields may be metal stripes that are used between the separate metamaterial tracks in order to create defined boundary conditions and to avoid crosstalk.

The RF shields may be created of the same metal layer as the metamaterial tracks 94a, 94b, 97a, and 97b but are unstructured (i.e., devoid of elementary structures) or are differently structured from the metamaterial tracks 94a, 94b, 97a, and 97b with elementary structures that have a resonance substantially different from the resonance of the elementary structures of metamaterial tracks 94a, 94b, 97a, and 97b such that the RF shields isolate the two mutually coupled structures from each other. For example, the RF shields may be made up of elementary structures that are highly absorptive (i.e., 80% absorptive or greater) with respect to mm-waves and the metamaterial tracks 94a, 94b, 97a, and 97b may be made up of elementary structures that a highly reflective (i.e., 80% reflectivity or greater) with respect to mm-waves, or vice versa. Thus, the RF shields insulate the two mutually coupled structures from each other.

Figure 11:
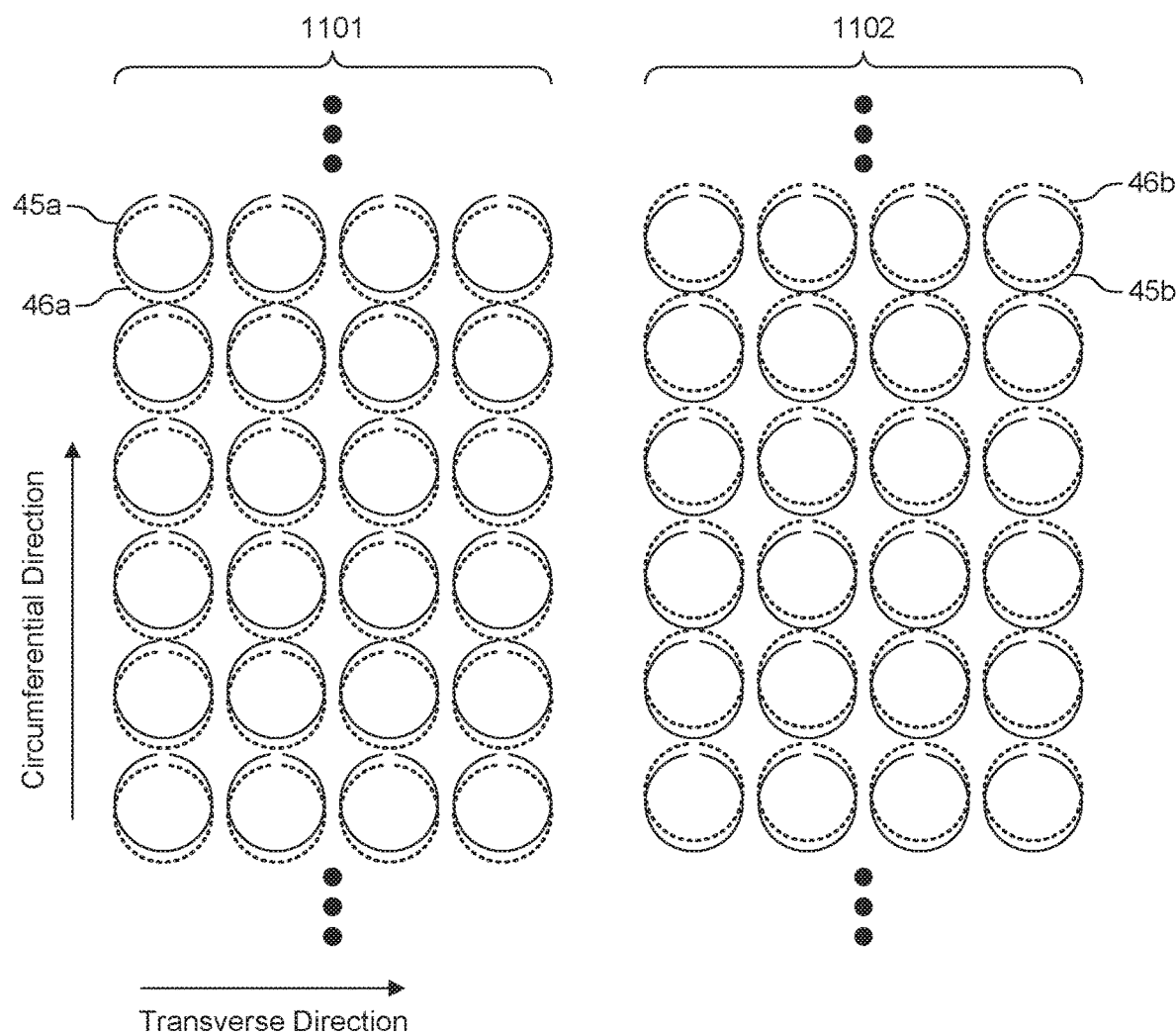
FIG. 11 shows two mutually coupled structures formed according to one or more of the above-described embodiments.

FIG. 11 shows two mutually coupled structures formed according to one or more of the above-described embodiments. In particular, a first mutually coupled structure 1101 is formed via two metamaterial tracks, each track being mechanically coupled to a different rotatable carrier structure. Similarly, a second mutually coupled structure 1102 is formed via two additional metamaterial tracks, each track being mechanically coupled to a different rotatable carrier structure.

For example, the first mutually coupled structure 1101 may be formed by tracks 45a and 46a and the second mutually coupled structure 1102 may be formed by tracks 45b and 46b, as described in reference to FIG. 6A.

Alternatively, the first mutually coupled structure 1101 may be formed by tracks 82b and 82c and the second mutually coupled structure 1102 may be formed by tracks 82d and 82e or by tracks 82f and 82g, as described in reference to FIG. 8.

Alternatively, the first mutually coupled structure 1101 may be formed by tracks 94a and 94b and the second mutually coupled structure 1102 may be formed by tracks 97a and 97b, as described in reference to FIGS. 9 and 10.

In each case, the metamaterial tracks extend circumferentially (i.e., lengthwise) in a circumferential direction (i.e., a rotation direction) with a width defined in the transverse direction.

For the purpose of explanation, it will be assumed that the first mutually coupled structure 1101 is formed by tracks 45a and 46a and the second mutually coupled structure 1102 is formed by tracks 45b and 46b. As described above in reference to FIG. 6A, a first rotatable carrier structure 41 is mechanically coupled to a rotational shaft 44 and configured to rotate about a rotational axis 43 in a rotation direction. Similarly, a second rotatable carrier structure 42 is mechanically coupled to the rotational shaft 44 and configured to rotate about the rotational axis 43 in the rotation direction, where the second rotatable carrier structure is spaced apart from the first rotatable carrier structure.

The first metamaterial track 45a is coupled to the first rotatable carrier structure 41, where the first metamaterial track 45a includes a first array of elementary structures. The second metamaterial track 45b is coupled to the first rotatable carrier structure 41, where the second metamaterial track 45b includes a second array of elementary structures.

The third metamaterial track 46a is coupled to the second rotatable carrier structure 42, where the third metamaterial track 46a includes a third array of elementary structures that are geometrically shifted in a first circumferential direction relative to the first array of elementary structures when zero torque is applied to the rotational shaft 44. An instance in which no torque is applied to the rotational shaft 44 can be regarded as a default position of the array structures and the position of the array structures changes when a rotational force (i.e., a torque) is applied to the rotational shaft 44. The first metamaterial track 45a and the third metamaterial track 46a are mutually coupled to each other by a first torque dependent coupling (e.g., an electric field coupling, a magnetic field coupling, or an electromagnetic field coupling).

As can be seen in FIG. 11, the third array of elementary structures of the third metamaterial track 46a are shifted downward (i.e., in the negative circumferential direction) with respect to the first array of elementary structures of the first metamaterial track 45a. As a result, the elementary structures of the two tracks 45a and 46a only partially overlap according to a first geometrical shift in the first circumferential direction when zero torque is applied to the rotational shaft.

The fourth metamaterial track 46b is coupled to the second rotatable carrier structure 42, where the fourth metamaterial track 46b includes a fourth array of elementary structures that are geometrically shifted in a second circumferential direction relative to the second array of elementary structures when zero torque is applied to the rotational shaft 44. The second circumferential direction is counter directional to the first circumferential direction, meaning one circumferential direction is clockwise and the other circumferential direction is counter-clockwise. The second metamaterial track 45b and the fourth metamaterial track 46b are mutually coupled to each other by a second torque dependent coupling (e.g., an electric field coupling, a magnetic field coupling, or an electromagnetic field coupling).

As can be seen in FIG. 11, the fourth array of elementary structures of the fourth metamaterial track 46b are shifted upward (i.e., in the positive circumferential direction) with respect to the second array of elementary structures of the second metamaterial track 45b. As a result, the elementary structures of the two tracks 45b and 46b only partially overlap according to a second geometrical shift in the second circumferential direction when zero torque is applied to the rotational shaft. Thus, the geometrical shift and therefore the overlap for tracks 45b and 46b is mechanically in the opposite circumferential direction when compared to the geometrical shift and the overlap of tracks 45a and 46a.

When a torque is applied to the rotational shaft 44, tracks 46a and 46b on the second rotatable carrier structure 42 may mechanically shift in the same circumferential direction relative to tracks 45a and 45b on the first rotatable carrier structure 41. In other words, a first change in a first mechanical overlap between the first array of elementary structures and the third array of elementary structures and a second change in a second mechanical overlap between the second array of elementary structures and the fourth array of elementary structures occur in a same circumferential direction such that the first mechanical overlap increases and the second mechanical overlap decreases.

For example, if the mechanical shift is in the positive circumferential direction, the overlap between the elementary structures of tracks 45a and 46a would increase. Thus, the mutual coupling between the elementary structures of tracks 45a and 46a would also increase. Meanwhile, the overlap between the elementary structures of tracks 45b and 46b would decrease. Thus, the mutual coupling between the elementary structures of tracks 45b and 46b would also decrease.

As a result, in response to a torque applied to the rotational shaft, the first geometrical shift may decrease such that the first torque dependent coupling between the first array of elementary structures and the third array of elementary structures increases, and the second geometrical shift may increase such that the second torque dependent coupling between the second array of elementary structures and the fourth array of elementary structures decreases. The opposite may also be true if the rotational direction of the shaft 44 is reversed.

As a result, in response to a torque applied to the rotational shaft, the first torque dependent coupling increases by a first amount and the second torque dependent coupling decreases by a second amount. These amounts may be equal or unequal depending on the type of elementary structures used and the pattern of the arrays.

Figure 12:
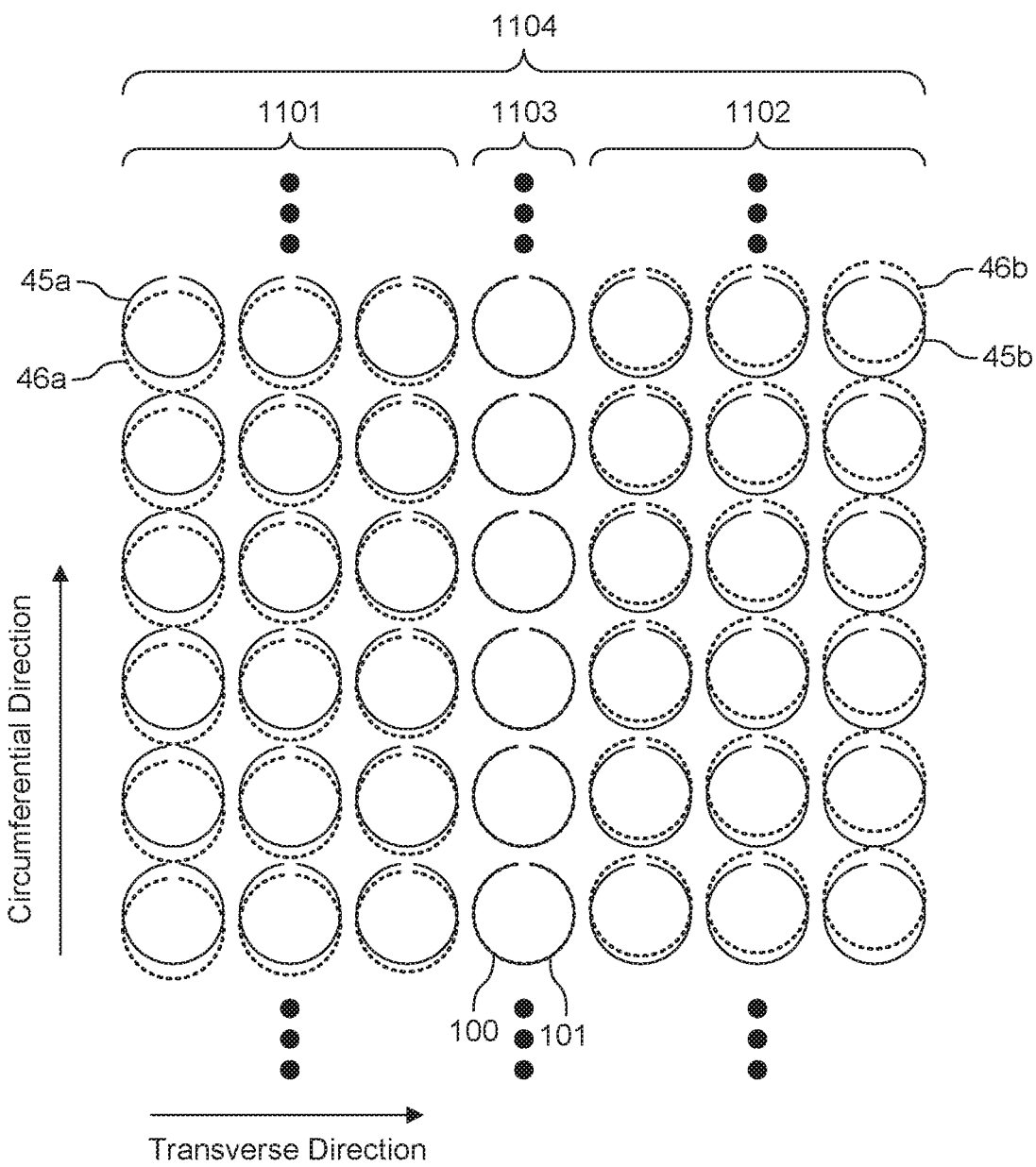
FIG. 12 shows a continuous mutually coupled structure that is formed in part by the mutually coupled structures shown in FIG. 11.

FIG. 12 shows a continuous mutually coupled structure 1104 that is formed in part by the mutually coupled structures 1101 and 1102 described in FIG. 11. In addition, a third mutually coupled structure 1103 is formed by a fifth metamaterial track 100 coupled to the first rotatable carrier structure 41 and a sixth metamaterial track 101 coupled to the second rotatable carrier structure 42.

The fifth metamaterial track 100 includes a fifth array of elementary structures and is interposed between the first metamaterial track 45a and the second metamaterial track 45b. The fifth array of elementary structures may comprise a one or more columns of elementary structures that extend circumferentially about the rotational shaft 44.

The sixth metamaterial track 101 includes a sixth array of elementary structures that are geometrically aligned with (i.e., fully overlapped with) the fifth array of elementary structures when zero torque is applied to the rotational shaft 44. Like the fifth array of elementary structures, the sixth array of elementary structures may comprise a one or more columns of elementary structures that extend circumferentially about the rotational shaft 44. In addition, the sixth metamaterial track is interposed between the third metamaterial track 46a and the fourth metamaterial track 46b.

The fifth metamaterial track 100 and the sixth metamaterial track 101 are mutually coupled to each other by a third torque dependent coupling (e.g., an electric field coupling, a magnetic field coupling, or an electromagnetic field coupling), thereby forming the third mutually coupled structure 1103. Because the fifth metamaterial track 100 and the sixth metamaterial track 101 are geometrically aligned when no torque is applied to the rotational shaft 44, the third torque dependent coupling is at a maximum in this instance.

It can also be said that the first array of elementary structures, the fifth array of elementary structures, and the second array of elementary structures form a first continuous array of elementary structures that extend in a transverse direction. Similarly, the third array of elementary structures, the sixth array of elementary structures, and the fourth array of elementary structures form a second continuous array of elementary structures that extend in the transverse direction. The two continuous arrays of elementary structures form the continuous mutually coupled structure 1104 via their mutual coupling.

Overall, the second continuous array of elementary structures has a geometrical shift relative to the first continuous array of elementary structures. Here, the geometrical shift incrementally changes in the transverse direction extending from an inner circumference of the second continuous array of elementary structures to an outer circumference of the second continuous array of elementary structures.

For example, the left most column of the first and the second continuous array of elementary structures (e.g., the inner diameter) are shifted from each other by a maximum amount in a first circumferential direction from each other. The right most column of the first and the second continuous array of elementary structures (e.g., the outer diameter) are shifted from each other by a maximum amount in a second circumferential direction from each other. The columns in between incrementally shift towards alignment, which is achieved at the fifth and sixth tracks 100 and 101. Thus, in the default position, there is a progressive and incremental shift from left to right (or vice versa) in which the geometrical shift between overlapped columns changes between two extreme counter-directional shifts, with complete alignment (zero geometrical shift) occurring at the third mutually coupled structure 1103.

The continuous mutually coupled structure 1104 may be used in both disc and cylinder embodiments described herein, including in FIGS. 4A-4C, 6A-D, 7, 8, 9, and 10.

Figure 13A:
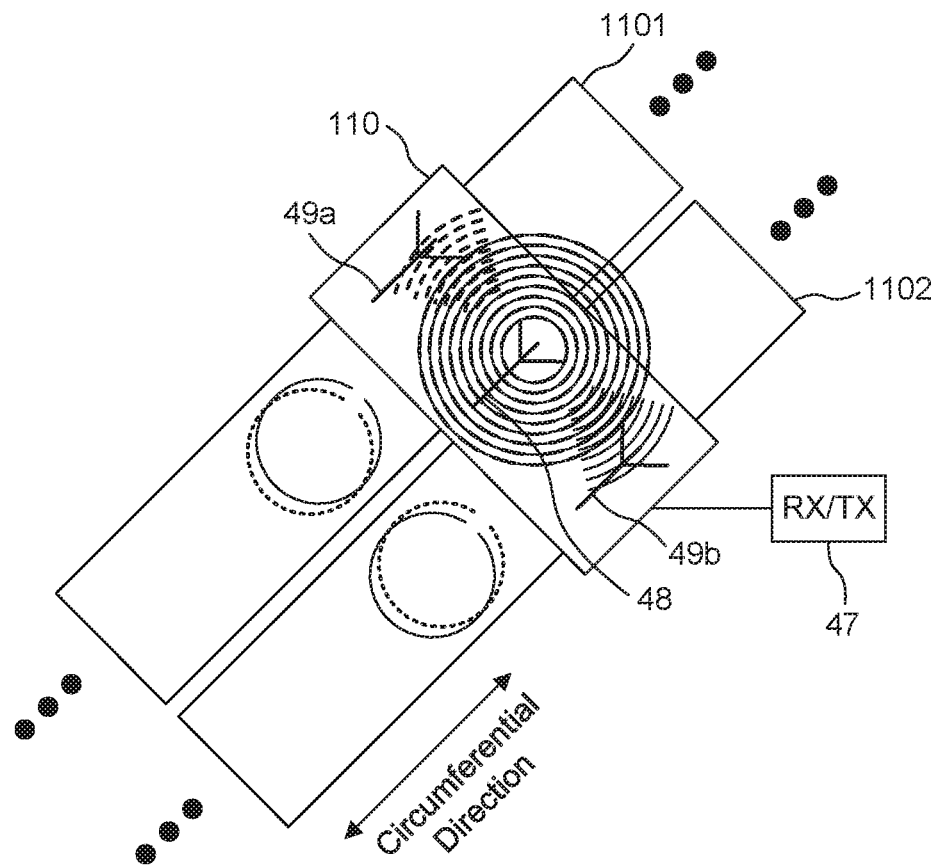
FIGS. 13A-13C show schematic diagrams of various antenna arrangements of a transceiver according to one or more embodiments.
Figure 13B:
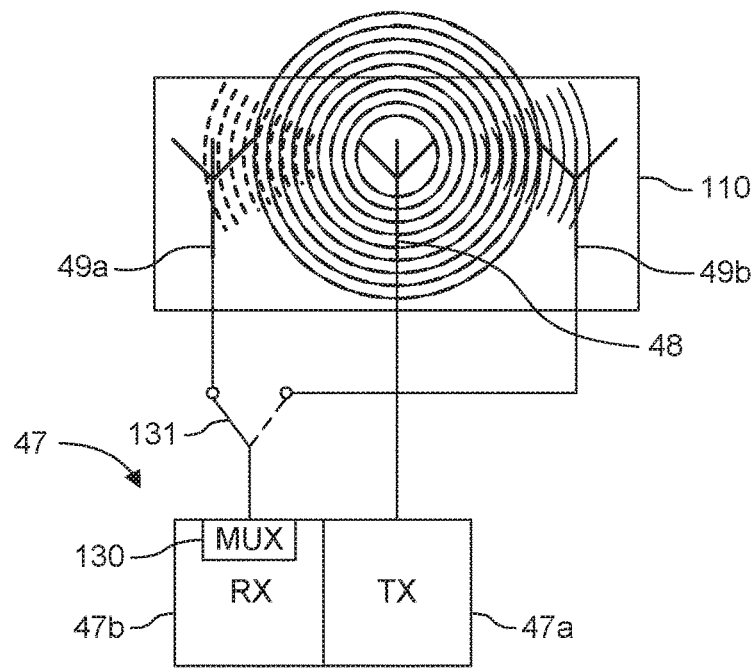
Figure 13C:
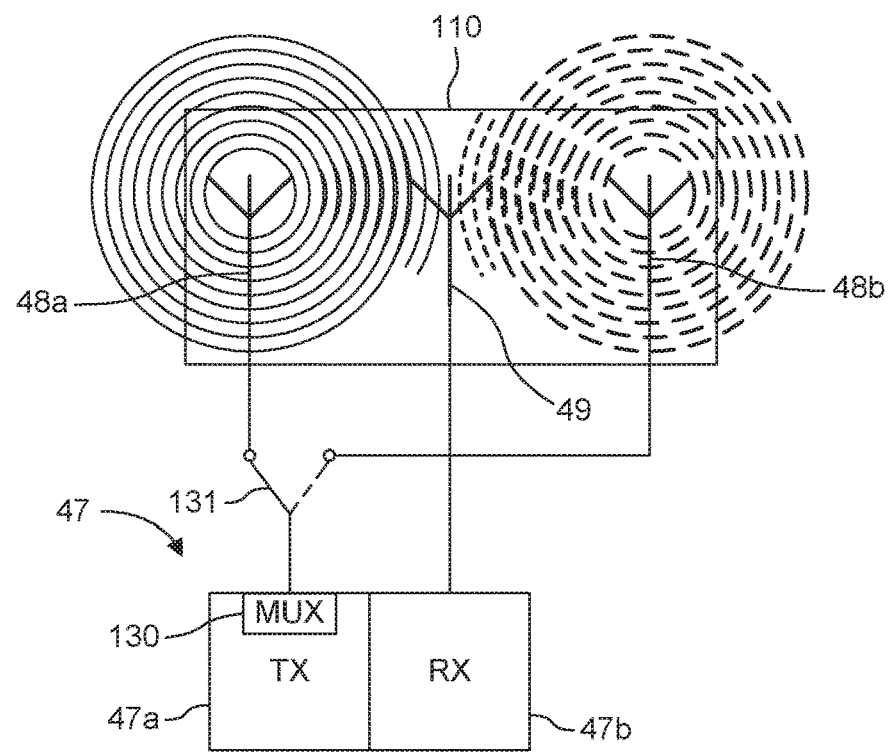

FIGS. 13A-13C show schematic diagrams of various antenna arrangements used by a transceiver according to one or more embodiments. In particular, the antenna arrangements are used by transceiver TRX 47 to transmit and receive mm-waves. The transceiver TRX 47 is coupled to an antenna system 110 that is arranged proximate to, overlapped with, or otherwise spatially aligned with the mutually coupled structures 1101 and 1102 such that transmit signals can be directed towards the mutually coupled structures 1101 and 1102 and such that receive signals can be received therefrom. In the case of FIG. 12, the antenna system 110 that is arranged proximate to, overlapped with, or otherwise spatially aligned with the continuous mutually coupled structure 1104. The antenna system 110 includes the transmitter antenna configuration 48 and the receiver antenna configuration 49 that are configured to transmit and receive mm-waves, respectively.

In FIG. 13A, a segment of each of the mutually coupled structures 1101 and 1102 is shown, with each segment extending further in a circumferential direction to form a full loop (i.e., a closed loop) or a partial loop around a rotational axis. Additionally, each segment may extend further in the transverse direction according to the size (e.g., width) of the arrays that make up the metamaterial tracks.

The antenna system 110 includes the transmitter antenna configuration 48 spatially interposed between two receive antenna configurations 49a and 49b. Alternatively, the transmit antenna configuration 48 may be interleaved with at least a portion the first receive antenna configuration 49a and at least a portion of the second receive antenna configuration 49b. The two receive antenna configurations 49a and 49b may each include a single receive antenna or an array of receive antennas. Similarly, the transmitter antenna configuration 48 may include a single transmit antenna or an array of transmit antennas. Thus, the transmitter antenna configuration 48 may be configured to transmit an electro-magnetic transmit signal towards the first mutually coupled structure 1101 and the second mutually coupled structure 1102.

The first mutually coupled structure 1101 is configured to convert the electro-magnetic transmit signal into a first electro-magnetic receive signal based on a torque applied to the rotational shaft and the second mutually coupled structure 1102 is configured to convert the electro-magnetic transmit signal into a second electro-magnetic receive signal based on the torque applied to the rotational shaft.

Alternatively, the transmitter antenna configuration 48 may be configured to transmit a first electro-magnetic directional beam via beamforming towards the first mutually coupled structure and transmit a second electro-magnetic directional beam via beamforming towards the second mutually coupled structure. The first mutually coupled structure is configured to convert the first electro-magnetic directional beam into a first electro-magnetic receive signal based on a torque applied to the rotational shaft. The second mutually coupled structure is configured to convert the second electro-magnetic directional beam into a second electro-magnetic receive signal based on the torque applied to the rotational shaft.

The receiver of the transceiver TRX 47 is configured to receive the first electro-magnetic receive signal from the receive antenna configuration 49a and the second electro-magnetic receive signal from the receive antenna configuration 49b. The receiver may include parallel receive paths coupled to each receive antenna configuration 49a and 49b, with each receive path having a configured weight.

The receiver is configured to determine the torque applied to the rotational shaft based on the first electro-magnetic receive signal and the second electro-magnetic receive signal based on, for example, a difference in phase shift, resonance frequency, reflectivity, or amplitude between the two receive signals.

For example, the receiver may be configured to generate a differential signal based on the first electro-magnetic receive signal and the second electro-magnetic receive signal, and determine the torque applied to the rotational shaft based on the differential signal. The differential signal may be generated by subtracting one receive signal, or a characteristic thereof, from the other receive signal, or the characteristic thereof. The characteristic may be the measured phase shift, resonance frequency, reflectivity, or amplitude of the two receive signals. For example, the receiver is configured to calculate a difference between the first electro-magnetic receive signal and the second electro-magnetic receive signal, and determine the torque applied to the rotational shaft based on the calculated difference.

Torque is applied to the rotational shaft 44 causes the first electro-magnetic receive signal to have a first phase shift relative to a phase of the electro-magnetic transmit signal and causes the second electro-magnetic receive signal to have a second phase shift relative to the phase of the electro-magnetic transmit signal. The receiver may be configured to determine the first phase shift and the second phase shift, and determine the torque applied to the rotational shaft based on the first phase shift and the second phase shift. In particular, the receiver may be configured to determine a difference between the first phase shift and the second phase shift, and determine the torque applied to the rotational shaft based on the difference between the first phase shift and the second phase shift. Additionally, or alternatively, a similar analysis may be performed for the other characteristics of the receive signals for determining the applied torque.

FIG. 13B shows a variation to the transceiver TRX 47 according to the antenna arrangement 110 used in FIG. 13A. Here, the receiver 47b and the transmitter of the transceiver TRX 47 are shown. The receiver 47b includes a multiplexer (MUX) 130 that controls a switch 131 to switchably couple the first receive antenna configuration 49a or the second receive antenna configuration 49b to the receiver 47b. Here, time-division multiplexing may be used for receiving the first electro-magnetic receive signal and the second electro-magnetic receive signal at different time slots. Thus, if an electro-magnetic receive signal is transmitted towards both mutually coupled structures 1101 and 1102, each electro-magnetic receive signal can be received and measured in its respective time slot. Such a configuration may help reduce the number of antennas.

FIG. 13C shows a variation to the transceiver TRX 47 according to the antenna arrangement 110 used in FIG. 13A. The transmitter 47a includes the multiplexer (MUX) 130 that controls the switch 131 to switchably couple a first transmit antenna configuration 48a or a second receive antenna configuration 48b to the transmitter 47a. The receive antenna configuration 49 may be spatially interposed between the first transmit antenna configuration 48a and the second receive antenna configuration 48b. Alternatively, the receive antenna configuration 49 may be interleaved with at least a portion the first transmit antenna configuration 48a and at least a portion of the second receive antenna configuration 48b.

Here, the first transmit antenna configuration 48a is configured to transmit a first electro-magnetic transmit signal towards the first mutually coupled structure 1101 and the second transmit antenna configuration 48b is configured to transmit a second electro-magnetic transmit signal towards the second mutually coupled structure. The first and the second transmit antenna configurations 48a and 48b may each comprise a signal antenna or an antenna array.

The first mutually coupled structure 1101 is configured to convert the first electro-magnetic transmit signal into a first electro-magnetic receive signal based on a torque applied to the rotational shaft 44, and the second mutually coupled structure 1102 is configured to convert the second electro-magnetic transmit signal into a second electro-magnetic receive signal based on the torque applied to the rotational shaft 44.

To help avoid interference, the MUX 130 selectively enables the transmit antenna configuration 48a or the second receive antenna configuration 48b via the control of the switch 131. For example, time-division multiplexing may be used for transmitting the first electro-magnetic transmit signal and the second electro-magnetic transmit signal at different time slots.

The receiver 47b is configured to receive the first electro-magnetic receive signal and the second electro-magnetic receive signal and determine the torque applied to the rotational shaft based on the first electro-magnetic receive signal and the second electro-magnetic receive signal according to any of the methods described herein.

A method of determining a torque applied to a rotatable shaft may include: transmitting an electro-magnetic transmit signal towards a first mutually coupled structure and a second mutually coupled structure that are mechanically coupled to the rotatable shaft; converting, by the first mutually coupled multitrack structure, the electro-magnetic transmit signal into a first electro-magnetic receive signal; converting, by the second mutually coupled multitrack structure, the electro-magnetic transmit signal into a second electro-magnetic receive signal; receiving the first electro-magnetic receive signal and the second electro-magnetic receive signal in a time-multiplexed manner; evaluating the received first electro-magnetic receive signal and the received second electro-magnetic receive signal; and determining the torque applied to the rotatable shaft based on the evaluated first electro-magnetic receive signal and the evaluated second electro-magnetic receive signal.

Here, the first electro-magnetic receive signal has a first property depending on an amount of the torque applied to the rotatable shaft, and the second electro-magnetic receive signal has a second property depending on the amount of the torque applied to the rotatable shaft. Evaluating the received first electro-magnetic receive signal and the received second electro-magnetic receive signal comprises determining a difference between the first property and the second property. Determining the torque applied to the rotatable shaft comprises determining the torque applied to the rotatable shaft based on the determined difference.

A method of determining a torque applied to a rotatable shaft may include: transmitting a first electro-magnetic transmit signal and a second electro-magnetic transmit signal in a time-multiplexed manner, wherein the first electro-magnetic transmit signal is transmitted towards a first mutually coupled structure and the second electro-magnetic transmit signal is transmitted towards a second mutually coupled structure; converting, by the first mutually coupled multitrack structure, the first electro-magnetic transmit signal into a first electro-magnetic receive signal; converting, by the second mutually coupled multitrack structure, the second electro-magnetic transmit signal into a second electro-magnetic receive signal; receiving the first electro-magnetic receive signal and the second electro-magnetic receive signal; evaluating the received first electro-magnetic receive signal and the received second electro-magnetic receive signal; and determining the torque applied to the rotatable shaft based on the evaluated first electro-magnetic receive signal and the evaluated second electro-magnetic receive signal.

Here, the first electro-magnetic receive signal has a first property depending on an amount of the torque applied to the rotatable shaft, and the second electro-magnetic receive signal has a second property depending on the amount of the torque applied to the rotatable shaft. Evaluating the received first electro-magnetic receive signal and the received second electro-magnetic receive signal comprises determining a difference between the first property and the second property. Determining the torque applied to the rotatable shaft comprises determining the torque applied to the rotatable shaft based on the determined difference.

While the examples provided use discs and cylinders, any other geometry may be used to carry the metamaterial structures, such as bladders. Also, even if planar structures appear to be the most attractive solutions for production cost from today's point of view, the metamaterial between the carrier discs or carrier cylinders need not be planar but may be a 3D structured metamaterial that is deformed depending on the applied torque.

Further, while various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A torque measurement system, comprising:
a first rotatable carrier structure mechanically coupled to a rotational shaft and configured to rotate about a rotational axis in a rotation direction;
a second rotatable carrier structure mechanically coupled to the rotational shaft and configured to rotate about the rotational axis in the rotation direction, wherein the second rotatable carrier structure is spaced apart from the first rotatable carrier structure;
a first metamaterial track mechanically coupled to the first rotatable carrier structure, wherein the first metamaterial track comprises a first array of elementary structures;
a second metamaterial track mechanically coupled to the first rotatable carrier structure, wherein the second metamaterial track comprises a second array of elementary structures;
a third metamaterial track mechanically coupled to the second rotatable carrier structure, wherein the third metamaterial track comprises a third array of elementary structures that are geometrically shifted in a first circumferential direction relative to the first array of elementary structures when zero torque is applied to the rotational shaft, and
a fourth metamaterial track mechanically coupled to the second rotatable carrier structure, wherein the fourth metamaterial track comprises a fourth array of elementary structures that are geometrically shifted in a second circumferential direction relative to the second array of elementary structures when zero torque is applied to the rotational shaft, the second circumferential direction being counter directional to the first circumferential direction,
wherein the first metamaterial track and the third metamaterial track are mutually coupled to each other by a first torque dependent coupling, thereby forming a first mutually coupled structure, and wherein the second metamaterial track and the fourth metamaterial track are mutually coupled to each other by a second torque dependent coupling, thereby forming a second mutually coupled structure.

2. The torque measurement system of claim 1, wherein:
the second rotatable carrier structure is spaced apart from the first rotatable carrier structure in an axial direction, and
the first metamaterial track and the second metamaterial track are spaced apart by a gap defined by a radial distance along a radial direction.

3. The torque measurement system of claim 2, wherein:
the first metamaterial track and the second metamaterial track are concentric,
the third metamaterial track and the fourth metamaterial track are concentric,
the first metamaterial track is congruent with the third metamaterial track, and
the second metamaterial track is congruent with the fourth metamaterial track.

4. The torque measurement system of claim 1, wherein:
the second rotatable carrier structure is spaced apart from the first rotatable carrier structure in a radial direction, and
the first metamaterial track and the second metamaterial track are spaced apart by a gap defined by an axial distance extending parallel to an axial direction.

5. The torque measurement system of claim 4, wherein:
the first metamaterial track is congruent with the second metamaterial track, and
the third metamaterial track is congruent with the fourth metamaterial track,
the first metamaterial track and the third metamaterial track are concentric,
the second metamaterial track and the fourth metamaterial track are concentric.

6. The torque measurement system of claim 1, wherein the first circumferential direction is a clockwise direction and the second circumferential direction is a counter-clockwise direction.

7. The torque measurement system of claim 1, wherein:
the first array of elementary structures partially overlap with the third array of elementary structures according to a first geometrical shift in the first circumferential direction when zero torque is applied to the rotational shaft, and
the second array of elementary structures partially overlap with the fourth array of elementary structures according to a second geometrical shift in the second circumferential direction when zero torque is applied to the rotational shaft.

8. The torque measurement system of claim 7, wherein, in response to a torque applied to the rotational shaft:
the first geometrical shift decreases such that the first torque dependent coupling between the first array of elementary structures and the third array of elementary structures increases, and
the second geometrical shift increases such that the second torque dependent coupling between the second array of elementary structures and the fourth array of elementary structures decreases.

9. The torque measurement system of claim 8, wherein the first torque dependent coupling and the second torque dependent coupling each include at least one of an electric field coupling or a magnetic field coupling.

10. The torque measurement system of claim 1, wherein, in response to a torque applied to the rotational shaft,
the first torque dependent coupling increases by a first amount and the second torque dependent coupling decreases by a second amount.

11. The torque measurement system of claim 1, wherein, in response to a torque applied to the rotational shaft,
a first change in a first mechanical overlap between the first array of elementary structures and the third array of elementary structures and a second change in a second mechanical overlap between the second array of elementary structures and the fourth array of elementary structures occur in a same circumferential direction such that the first mechanical overlap increases and the second mechanical overlap decreases.

12. The torque measurement system of claim 1, further comprising:
a fifth metamaterial track coupled to the first rotatable carrier structure, wherein the fifth metamaterial track comprises a fifth array of elementary structures, and wherein the fifth metamaterial track is interposed between the first metamaterial track and the second metamaterial track; and
a sixth metamaterial track coupled to the second rotatable carrier structure, wherein the sixth metamaterial track comprises a sixth array of elementary structures that are geometrically aligned with the fifth array of elementary structures when zero torque is applied to the rotational shaft, and wherein the sixth metamaterial track is interposed between the third metamaterial track and the fourth metamaterial track.

13. The torque measurement system of claim 12, wherein the fifth metamaterial track and the sixth metamaterial track are mutually coupled to each other by a third torque dependent coupling, thereby forming a third mutually coupled structure, wherein the third torque dependent coupling is at a maximum when zero torque is applied to the rotational shaft.

14. The torque measurement system of claim 12, wherein:
the first array of elementary structures, the fifth array of elementary structures, and the second array of elementary structures form a first continuous array of elementary structures that extend in a transverse direction, and
the third array of elementary structures, the sixth array of elementary structures, and the fourth array of elementary structures form a second continuous array of elementary structures that extend in the transverse direction.

15. The torque measurement system of claim 14, wherein the second continuous array of elementary structures have a geometrical shift relative to the first continuous array of elementary structures, wherein the geometrical shift incrementally changes in the transverse direction extending from an inner circumference of the second continuous array of elementary structures to an outer circumference of the second continuous array of elementary structures.

16. The torque measurement system of claim 1, further comprising:
a transmitter configured to transmit an electro-magnetic transmit signal towards the first mutually coupled structure and the second mutually coupled structure, wherein the first mutually coupled structure is configured to convert the electro-magnetic transmit signal into a first electro-magnetic receive signal based on a torque applied to the rotational shaft and the second mutually coupled structure is configured to convert the electro-magnetic transmit signal into a second electro-magnetic receive signal based on the torque applied to the rotational shaft; and a receiver configured to receive the first electro-magnetic receive signal and the second electro-magnetic receive signal, and determine the torque applied to the rotational shaft based on the first electro-magnetic receive signal and the second electro-magnetic receive signal.

17. The torque measurement system of claim 16, wherein the receiver comprises:
a first receive antenna configured to receive the first electro-magnetic receive signal;
a second receive antenna configured to receive the second electro-magnetic receive signal; and
a multiplexer configured to switchably couple the first receive antenna or the second receive antenna to the receiver.

18. The torque measurement system of claim 17, wherein the transmitter comprises a transmit antenna configured to transmit the electro-magnetic transmit signal, wherein the transmit antenna is spatially interposed between the first receive antenna and the second receive antenna.

19. The torque measurement system of claim 16, wherein the receiver is configured to generate a differential signal based on the first electro-magnetic receive signal and the second electro-magnetic receive signal, and determine the torque applied to the rotational shaft based on the differential signal.

20. The torque measurement system of claim 16, wherein the receiver is configured to calculate a difference between the first electro-magnetic receive signal and the second electro-magnetic receive signal, and determine the torque applied to the rotational shaft based on the calculated difference.

21. The torque measurement system of claim 16, wherein:
wherein the torque applied to the rotational shaft causes the first electro-magnetic receive signal to have a first phase shift relative to a phase of the electro-magnetic transmit signal and causes the second electro-magnetic receive signal to have a second phase shift relative to the phase of the electro-magnetic transmit signal, and
the receiver is configured to determine the first phase shift and the second phase shift, and determine the torque applied to the rotational shaft based on the first phase shift and the second phase shift.

22. The torque measurement system of claim 21, wherein the receiver is configured to determine a difference between the first phase shift and the second phase shift, and determine the torque applied to the rotational shaft based on the difference between the first phase shift and the second phase shift.

23. The torque measurement system of claim 1, further comprising:
a transmitter comprising at least one transmit antenna configured to transmit a first electro-magnetic directional beam via beamforming towards the first mutually coupled structure, wherein the first mutually coupled structure is configured to convert the first electro-magnetic directional beam into a first electro-magnetic receive signal based on a torque applied to the rotational shaft, and transmit a second electro-magnetic directional beam via beamforming towards the second mutually coupled structure, wherein the second mutually coupled structure is configured to convert the second electro-magnetic directional beam into a second electro-magnetic receive signal based on the torque applied to the rotational shaft; and
a receiver comprising at least one receive antenna configured to receive the first electro-magnetic receive signal and the second electro-magnetic receive signal, wherein the receiver is configured to determine the torque applied to the rotational shaft based on the first electro-magnetic receive signal and the second electro-magnetic receive signal.

24. The torque measurement system of claim 1, further comprising:
a transmitter comprising a first transmit antenna configuration configured to transmit a first electro-magnetic transmit signal towards the first mutually coupled structure, wherein the first mutually coupled structure is configured to convert the first electro-magnetic transmit signal into a first electro-magnetic receive signal based on a torque applied to the rotational shaft, and a second transmit antenna configuration configured to transmit a second electro-magnetic transmit signal towards the second mutually coupled structure, wherein the second mutually coupled structure is configured to convert the second electro-magnetic transmit signal into a second electro-magnetic receive signal based on the torque applied to the rotational shaft; and
a receiver comprising at least one receive antenna configured to receive the first electro-magnetic receive signal and the second electro-magnetic receive signal, wherein the receiver is configured to determine the torque applied to the rotational shaft based on the first electro-magnetic receive signal and the second electro-magnetic receive signal.

25. The torque measurement system of claim 24, wherein the transmitter further comprises:
a multiplexer configured to switchably couple the first transmit antenna configuration or the second transmit antenna configuration to the transmitter.

26. A method of determining a torque applied to a rotatable shaft, the method comprising:
transmitting electro-magnetic transmit signals towards a first mutually coupled structure and a second mutually coupled structure that are mechanically coupled to the rotatable shaft;
converting, by the first mutually coupled multitrack structure, a first one of the electro-magnetic transmit signals into a first electro-magnetic receive signal;
converting, by the second mutually coupled multitrack structure, a second one of the electro-magnetic transmit signals into a second electro-magnetic receive signal;
receiving the first electro-magnetic receive signal and the second electro-magnetic receive signal in a time-multiplexed manner;
evaluating the received first electro-magnetic receive signal and the received second electro-magnetic receive signal; and
determining the torque applied to the rotatable shaft based on the evaluated first electro-magnetic receive signal and the evaluated second electro-magnetic receive signal.

27. The method of claim 26, wherein:
the first electro-magnetic receive signal has a first property depending on an amount of the torque applied to the rotatable shaft,
the second electro-magnetic receive signal has a second property depending on the amount of the torque applied to the rotatable shaft,
evaluating the received first electro-magnetic receive signal and the received second electro-magnetic receive signal comprises determining a difference between the first property and the second property, and determining the torque applied to the rotatable shaft comprises determining the torque applied to the rotatable shaft based on the determined difference.

28. A torque measurement system, comprising:
a first rotatable carrier structure mechanically coupled to a rotational shaft and configured to rotate about a rotational axis in a rotation direction;
a second rotatable carrier structure mechanically coupled to the rotational shaft and configured to rotate about the rotational axis in the rotation direction, wherein the second rotatable carrier structure is spaced apart from the first rotatable carrier structure;
a first mutually coupled structure comprising a first track mechanically coupled to the first rotatable carrier structure and a second track mechanically coupled to the second rotatable carrier structure, wherein the first track and the second track are coupled together by a first torque dependent coupling;
a second mutually coupled structure comprising a third track mechanically coupled to the first rotatable carrier structure and a fourth track mechanically coupled to the second rotatable carrier structure, wherein the third track and the fourth track are coupled together by a second torque dependent coupling,
wherein, in response to a rotation of the rotational shaft, the first torque dependent coupling is configured to increase and the second torque dependent coupling is configured to decrease.

29. The torque measurement system of claim 28, wherein the first track comprises a first array of metamaterial structures, the second track comprises a second array of metamaterial structures, the third track comprises a third array of metamaterial structures, the fourth track comprises a fourth array of metamaterial structures.

30. The torque measurement system of claim 28, wherein the first torque dependent coupling and the second torque dependent coupling each include at least one of an electric field coupling or a magnetic field coupling.

\* \* \* \* \*